US010805111B2

(12) United States Patent
McCue et al.

(10) Patent No.: US 10,805,111 B2
(45) Date of Patent: Oct. 13, 2020

(54) SIMULTANEOUSLY RENDERING AN IMAGE STREAM OF STATIC GRAPHIC IMAGES AND A CORRESPONDING AUDIO STREAM

(71) Applicant: Audio Pod Inc., Ottawa, Ontario (CA)

(72) Inventors: John McCue, Ottawa (CA); Robert McCue, Ottawa (CA); Gregory Shostakovsky, Kanata (CA); Glenn McCue, Ottawa (CA)

(73) Assignee: Audio Pod Inc., Ottawa, Ontario (CA)

( * ) Notice: Subject to any disclaimer, the term of this patent is extended or adjusted under 35 U.S.C. 154(b) by 61 days.

(21) Appl. No.: 16/267,550

(22) Filed: Feb. 5, 2019

(65) Prior Publication Data
US 2019/0173690 A1    Jun. 6, 2019

Related U.S. Application Data

(63) Continuation of application No. 15/652,236, filed on Jul. 18, 2017, which is a continuation of application
(Continued)

(51) Int. Cl.
*H04L 12/46* (2006.01)
*H04L 29/06* (2006.01)
(Continued)

(52) U.S. Cl.
CPC ...... *H04L 12/4633* (2013.01); *G06F 9/45558* (2013.01); *H04L 41/0668* (2013.01);
(Continued)

(58) Field of Classification Search
CPC ............. H04L 12/4633; H04L 41/0668; H04L 41/0836; H04L 43/08; H04L 43/0811;
(Continued)

(56) References Cited

U.S. PATENT DOCUMENTS 5,586,264 A * 12/1996 Belknap ................ G06F 3/0601
707/E17.028
6,621,980 B1 * 9/2003 Gould ...................... H04N 7/16
348/E7.054
(Continued)

FOREIGN PATENT DOCUMENTS

EP         1463258 A1    9/2004    ............. H04L 29/06
WO       01/58165 A2    8/2001    ............... H04N 7/24
(Continued)

OTHER PUBLICATIONS

"SpeechSkimmer: A System for Interactively Skimming Recorded Speech" by Barry Arons, MIT Media Lab, ACM Transactions on Computer-Human Interaction, vol. 4, No. 1, Mar. 1997, pp. 3-38.
(Continued)

*Primary Examiner* — Alan S Chou
(74) *Attorney, Agent, or Firm* — Teitelbaum & Bouevitch; Neil Teitelbaum

(57) ABSTRACT

An image stream of static graphic images and a corresponding audio stream (e.g., a comic book image stream and an audio narration stream) are simultaneously rendered. One or more images from the image stream, which are each associated with time information relative to a timeline of the audio stream, are downloaded to the client device. A page is assembled from the images and is assigned time information relative to the timeline of the audio stream on the basis of the time information for the images. A portion of the audio stream including a time offset corresponding to a position on the page is downloaded to the client device. The page and the portion of the audio stream are simultaneously rendered on the client device by using the time information for the images or for the page, the portion of the audio stream being rendered in dependence upon the time offset.

16 Claims, 28 Drawing Sheets

Related U.S. Application Data

No. 15/062,610, filed on Mar. 7, 2016, now Pat. No. 9,729,907, which is a continuation of application No. 13/313,393, filed on Dec. 7, 2011, now Pat. No. 9,319,720, which is a continuation-in-part of application No. 12/096,933, filed as application No. PCT/CA2006/002046 on Dec. 12, 2006, now Pat. No. 8,285,809.

(60) Provisional application No. 61/420,352, filed on Dec. 7, 2010, provisional application No. 60/749,632, filed on Dec. 13, 2005.

(51) Int. Cl.

| | | |
|---|---|---|
| *H04L 12/26* | (2006.01) | |
| *H04L 12/741* | (2013.01) | |
| *G06F 9/455* | (2018.01) | |
| *H04L 12/24* | (2006.01) | |
| *H04L 29/08* | (2006.01) | |

(52) U.S. Cl.
CPC .......... *H04L 41/0836* (2013.01); *H04L 43/08* (2013.01); *H04L 43/0811* (2013.01); *H04L 45/74* (2013.01); *H04L 67/10* (2013.01); *H04L 69/22* (2013.01); *G06F 2009/45579* (2013.01); *G06F 2009/45595* (2013.01); *H04L 43/0817* (2013.01); *H04L 43/0829* (2013.01); *H04L 43/0852* (2013.01); *H04L 43/0864* (2013.01); *H04L 43/0876* (2013.01)

(58) Field of Classification Search
CPC ......... H04L 45/74; H04L 67/10; H04L 67/69; H04L 67/22; H04L 43/0817; H04L 43/0829; H04L 43/0852; H04L 43/0864; H04L 43/0876; G06F 9/45558; G06F 2009/45579; G06F 2009/45595
USPC .......................................................... 370/392
See application file for complete search history.

(56) References Cited

U.S. PATENT DOCUMENTS

| | | | | |
|---|---|---|---|---|
| 6,850,982 | B1 | 2/2005 | Siegel ............................ | 709/227 |
| 7,242,809 | B2 | 7/2007 | Hunter et al. ................. | 382/224 |
| 7,454,763 | B2* | 11/2008 | Veselova .................. | G09B 5/00 715/200 |
| 7,721,301 | B2 | 5/2010 | Wong et al. .................. | 719/322 |
| 7,984,147 | B2 | 7/2011 | Daoud et al. ................. | 709/226 |
| 2002/0069218 | A1 | 6/2002 | Sull et al. ...................... | 715/202 |
| 2002/0087555 | A1* | 7/2002 | Murata ................. | G06F 16/683 |
| 2002/0087694 | A1 | 7/2002 | Daoud et al. ................. | 709/226 |
| 2002/0184189 | A1 | 12/2002 | Hay et al. ......................... | 707/1 |
| 2003/0091338 | A1 | 5/2003 | Snow et al. ..................... | 386/96 |
| 2003/0167262 | A1 | 9/2003 | Iida et al. | |
| 2003/0172346 | A1 | 9/2003 | Gould et al. ............... | 715/501.1 |
| 2003/0195021 | A1* | 10/2003 | Yamashita ......... | G06Q 20/1235 463/1 |
| 2003/0221194 | A1 | 11/2003 | Thiagarajan et al. .......... | 725/55 |
| 2005/0061873 | A1 | 3/2005 | Pirillo ........................... | 235/380 |
| 2005/0091062 | A1 | 4/2005 | Burges et al. ................ | 704/273 |
| 2005/0111824 | A1 | 5/2005 | Hunter et al. .................. | 386/52 |
| 2005/0245243 | A1 | 11/2005 | Zuniga ........................ | 455/414.3 |
| 2005/0250439 | A1 | 11/2005 | Leslie .......................... | 455/11.1 |
| 2005/0276570 | A1 | 12/2005 | Reed, Jr. et al. ............... | 386/46 |
| 2006/0140162 | A1 | 6/2006 | Vasa .............................. | 370/338 |
| 2006/0236219 | A1 | 10/2006 | Grigorovitch et al. ..... | 715/500.1 |
| 2006/0242550 | A1 | 10/2006 | Rahman et al. ........... | 715/500.1 |
| 2006/0271989 | A1 | 11/2006 | Glaser et al. ................. | 725/111 |
| 2007/0041356 | A1 | 2/2007 | Fontijn ........................ | 370/352 |
| 2007/0067267 | A1 | 3/2007 | Ives | |
| 2007/0083354 | A1 | 4/2007 | Collins et al. ................. | 703/23 |
| 2007/0083911 | A1 | 4/2007 | Madden et al. .............. | 725/135 |
| 2007/0112837 | A1 | 5/2007 | Houh et al. .................. | 707/102 |
| 2007/0124331 | A1 | 5/2007 | Griffin | |
| 2007/0168413 | A1* | 7/2007 | Barletta ............. | G06F 3/04883 709/203 |
| 2008/0320378 | A1* | 12/2008 | Shuter ..................... | G06T 13/80 715/203 |
| 2009/0171750 | A1 | 7/2009 | Zhou et al. ................. | 705/14.53 |
| 2009/0177996 | A1 | 7/2009 | Hunt et al. ................... | 715/788 |
| 2009/0202226 | A1* | 8/2009 | McKay .................... | G09B 5/06 386/239 |
| 2010/0281509 | A1 | 11/2010 | Yu et al. ....................... | 725/100 |
| 2011/0118858 | A1 | 5/2011 | Rottler et al. .................. | 700/94 |
| 2018/0307664 | A1* | 10/2018 | Siegel ..................... | G06F 21/10 |

FOREIGN PATENT DOCUMENTS

| | | | | |
|---|---|---|---|---|
| WO | 02/08948 | A2 | 1/2002 | ............. G06F 17/00 |
| WO | 02/080524 | A2 | 10/2002 | .............. H04N 5/00 |

OTHER PUBLICATIONS

EPUB Media Overlays 3.0, International Digital Publishing Forum, (http://idpf.org/epub/30/spec/epub30-mediaoverlays-20110516.html), May 16, 2011.

EP search report from related EP application No. EP06840473.

Delacourt P. et al, "A speaker-based segmentation for audio data indexing", Speech Communication, Elsevier Science Publishers, Amsterdam, NL, vol. 32, No. 1-2, pp. 111-126, Sep. 1, 2000.

* cited by examiner

SIMULTANEOUSLY RENDERING AN IMAGE STREAM OF STATIC GRAPHIC IMAGES AND A CORRESPONDING AUDIO STREAM

CROSS-REFERENCE TO RELATED APPLICATIONS

This application is a continuation of U.S. patent application Ser. No. 15/652,236, filed on Jul. 18, 2017, which is a continuation Ser. No. 15/062,610, filed on Mar. 7, 2016, which is a continuation of U.S. patent application Ser. No. 13/313,393, filed on Dec. 7, 2011, which claims priority from U.S. Provisional Application No. 61/420,352 filed on Dec. 7, 2010, and which is a continuation-in-part of U.S. patent application Ser. No. 12/096,933, filed on Jun. 11, 2008, which is a National Stage of International Application No. PCT/CA2006/002046, filed on Dec. 12, 2006, which claims priority from U.S. Provisional Application No. 60/749,632, filed on Dec. 13, 2005, all of which are hereby incorporated by reference in their entireties.

TECHNICAL FIELD

The present application relates generally to the rendering of digital content, and in particular, to a system, method, and computer-readable code for rendering digital content using time offsets.

BACKGROUND OF THE INVENTION

Traditionally, there have been two different approaches for delivering digital audio data. In the first approach, the digital audio data is mass downloaded. More specifically, and as shown schematically in FIG. 1, one or more files corresponding to an entire audio stream 10 is transmitted one frame 12 at a time from the server to the client. Once the entire audio stream 10 has been received and reassembled to form a continuous, contiguous audio stream, it is stored in storage 14 prior to being transmitted to a media player 16.

In the second approach, streaming technology is used to deliver the digital audio data 'just-in-time'. More specifically, and as shown schematically in FIG. 2, an entire audio stream 20 is transmitted one frame 22 at a time from the server to the client, where it is received and reassembled, in part, to provide a continuous, contiguous audio stream (i.e., a small portion of audio stream continuity is preserved). Once each frame is played by the media player 26, it is then discarded from the buffer.

Small audio streams, or audio-video streams, which for example correspond to individual songs, very short movies, and music videos, are typically transmitted using the first approach. In terms of the delivery of these smaller streams of media, the delays experienced by the users are generally tolerated because they are relatively short in nature. Typically, time delays are measured as one or two minutes, and although possible, tend not to exceed this.

The delivery of larger audio streams, which for example include books and radio shows, presents a problem for the user community. Whereas a single song that plays for 4 minutes may take 1 minute to download, an audio book that plays for 12 hours may take 3 to 4 hours to download. Although the general performance is relatively the same in terms of throughput rate, users of this media complain about the hours of waiting to receive and use the media selected.

While streaming technology obviates the waiting associated with mass download, any degradation experienced in the delivery of the content in real time introduces interruptions in the audio stream, causing breaks and interruptions in the users experience of that audio stream. Moreover, since the digital audio data is not stored, repositioning within the audio stream (e.g., using rewind or fast forward functions) interrupts the just-in-time nature of content delivery, and thus, may introduce significant delays and/or be inefficient. For example, in the case of rewinding a streamed audio stream, the content associated with the new position selected in the audio stream will need to be downloaded a second time and the future content temporarily stored in the buffer will be discarded.

In both of these existing technologies, great effort is made to reassemble the audio stream into a continuous, contiguous audio stream prior to being presented to the media player. In the case of the mass download approach, the entire audio stream is downloaded and reassembled prior to use. In streaming technologies, a very small portion of the audio stream is downloaded and reassembled prior to use with additional content delivered and already played content discarded continuously, to maintain a very small portion of continuity in the audio stream. Notably, this reconstruction of the audio stream complicates the digital audio data delivery and increases delivery time.

In addition, in both of the existing technologies, the user has limited tracking options. For example, 'The Godfather' is an audio book that, as commercially released, contains 24 MP3 files that require 80 megabytes of storage and plays at normal speed for a total of almost 9 hours. In order to use these files with existing mass download technology, the user must manually keep track of which file is currently being listened to and where one is in that particular file.

Tracking problems also develop if the users audio player automatically changes files, if the user is listening to multiple audio streams and/or if the user listens to audio streams on more than one client device (e.g. if a user is listening to the audio stream at work and wants to resume play at home). It can be particularly difficult and time consuming for the user to resume listening to an audio stream at a specific position.

In addition, tracking problems will develop during cross-media switching (e.g. between audio and text). For example, if a user is listening to an e-book in the car and later wants to start reading the e-book at home, tracking problems will develop because the granularity provided by the prior art methods is insufficient to tie the audio stream to the corresponding eText at a letter or word level. Further complications are expected when the cross media switching is not on a single platform (e.g., a single computer), but rather is on multiple platforms (e.g., between a computer and a cell phone or e-Reader).

SUMMARY OF THE INVENTION

According to one embodiment of the instant invention, some of the above-described disadvantages are obviated by segmenting an audio stream into a plurality of small digital audio files using gaps in the natural language of the audio stream. These small digital audio files are transmitted, loaded, and played, in a specific order, such that from the user's perspective, the audio stream is reproduced in an apparently seamless manner. Advantageously, this is done without reassembling the audio stream, either in whole or in part. Further advantageously, since the small digital audio files are created using natural language gaps, they can be sufficiently small to ensure that a first small digital audio file is downloaded and played without significant delay, while successive small digital audio files are downloaded to be played in the future. Accordingly, the user receives the audio-on-demand in a timely manner.

According to another embodiment of the instant invention, some of the above-described disadvantages are obviated by providing a virtual audio stream descriptor, which includes a record of the position of each small digital audio file in the audio stream, to increase tracking options. More specifically, the virtual audio stream descriptor and one or more predetermined time offsets into the audio stream are used to position or reposition the audio stream at will. The predetermined time offsets are typically provided via internal media marks, external media marks, and/or rewind/fast-forward functions.

According to another embodiment of the instant invention, some of the above-described disadvantages are obviated by using a virtual media descriptor, which defines a plurality of digital media files in terms of time relative to a timeline of a complete audio recording, to tie the narrated text to the corresponding eText. Advantageously, using the continuous timeline of the complete audio recording allows cross media switching in a seamless manner.

In accordance with one aspect of the instant invention there is provided a method of rendering digital content comprising: providing a media player having access to at least one server via a network, the at least one server having stored thereon a descriptor file and a plurality of digital data files derived from an originating work, the descriptor file including time information for defining each digital data file, the time information determined relative to a timeline of an audio recording of the originating work; selecting the digital content to be rendered from the plurality of digital data files using the time information in the descriptor file and a time offset external to the descriptor file, the time offset determined relative to the timeline of the audio recording; rendering the selected digital content using the media player.

In accordance with one aspect of the instant invention there is provided a method of rendering digital content comprising: providing a media player having access to at least one server via a network, the at least one server having stored thereon a descriptor file and a plurality of digital data files derived from an originating work, the descriptor file including time information for defining each digital data file, the time information determined relative to a timeline of an audio recording of the originating work; selecting the digital content to be rendered from the plurality of digital data files using the time information in the descriptor file and a time offset external to the descriptor file, the time offset determined relative to the timeline of the audio recording; and rendering the selected digital content using the media player, wherein the digital data includes at least one electronic text file and at least one digital audio file, and wherein rendering the selected digital content using the media player comprises providing automated page turns for text derived from the at least one electronic text file, the automated page turns determined in dependence upon a progressing time offset relative to the rendering of the at least one digital audio file.

In accordance with another aspect of the instant invention there is provided a system for rendering digital content comprising: a server having stored thereon digital data corresponding to an originating work and a descriptor file, the descriptor file including time information for defining the digital data, the time information determined relative to a timeline of an audio recording of the originating work; a client for rendering the digital data corresponding to the originating work; and a network for connecting the server and the client and facilitating transmission of the digital data from the server to the client, wherein the client renders the digital content using the time information in the descriptor file and a time offset external to the descriptor file, the time offset determined relative to the timeline of the audio recording.

In accordance with another aspect of the instant invention there is provided a computer readable storage medium including computer readable code, which when executed by a computer, causes said computer to: download digital content from at least one server, the at least one server having stored thereon a descriptor file and a plurality of digital data files derived from an originating work, the descriptor file including time information for defining each digital data file, the time information determined relative to a timeline of an audio recording of the originating work, the computer having access to the at least one server via a network; select a point within the digital content from which to begin rendering, the point selected using the time information in the descriptor file and a time offset external to the descriptor file, the time offset determined relative to the timeline of the audio recording; and begin rendering the digital content from the selected point.

In accordance with another aspect of the instant invention there is provided a computer readable storage medium including computer readable code, which when executed by a computer, causes said computer to: render digital content, the computer having access to at least one server via a network, the at least one server having stored thereon digital data corresponding to an originating work and a descriptor file, the descriptor file including time information for defining the digital data, the time information determined relative to a timeline of an audio recording of the originating work, the digital data including the digital content; determine a current time offset while rendering the digital content; and create a bookmark for a selected point in the rendered digital content, the bookmark an electronic file including the current time offset and an identification of the descriptor file, the current time offset being a time difference from a beginning of the audio recording to a selected point in the audio recording, the selected point in the audio recording corresponding to the selected point in the digital content.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

Figure 1:
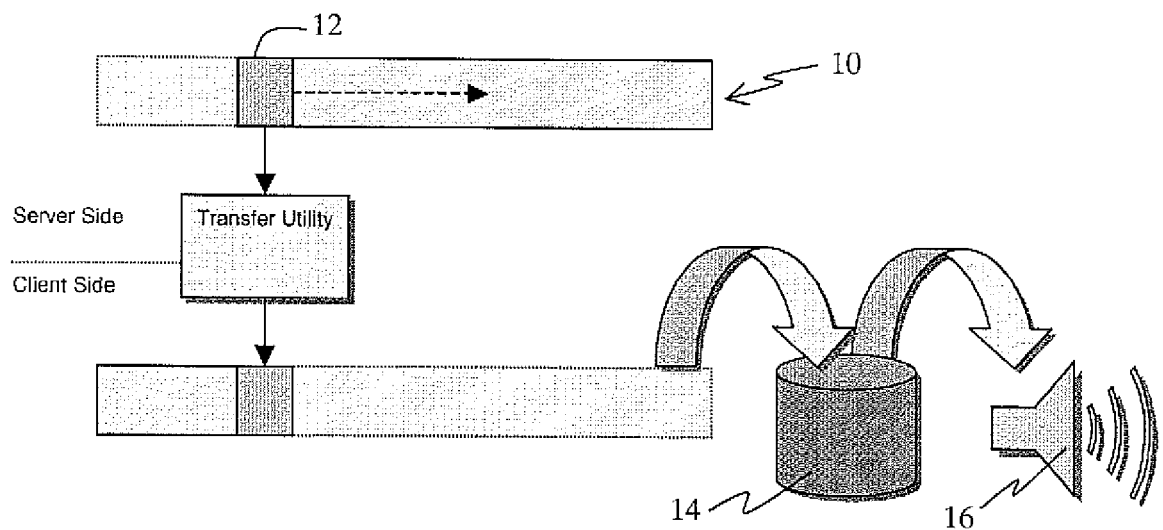
FIG. 1 is a schematic diagram showing the prior art mass download of an audio stream.
Figure 2:
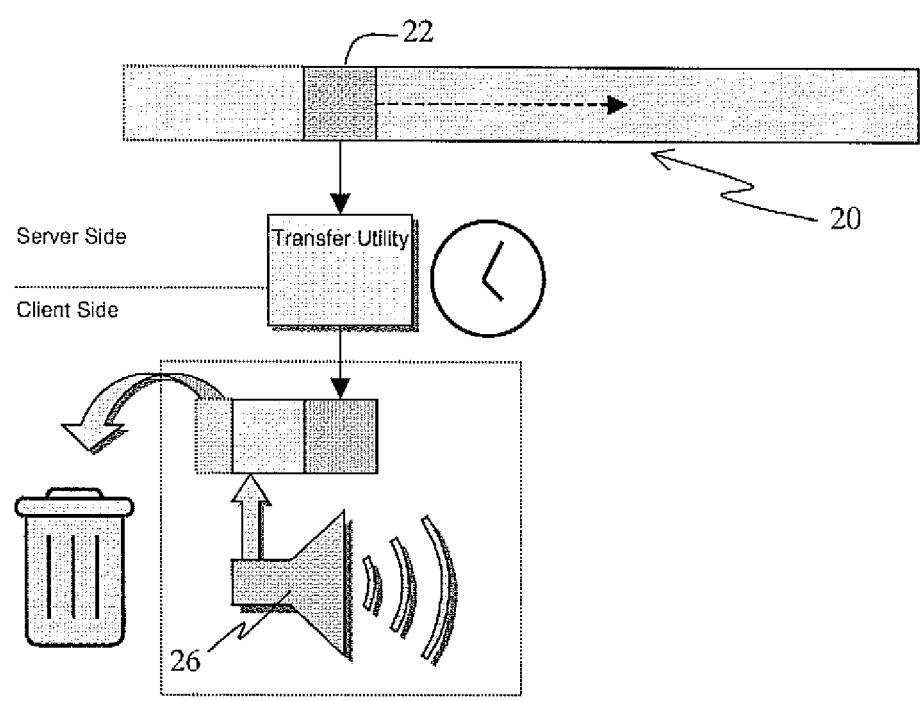
FIG. 2 is a schematic diagram showing prior art streaming of an audio stream.
Figure 3:
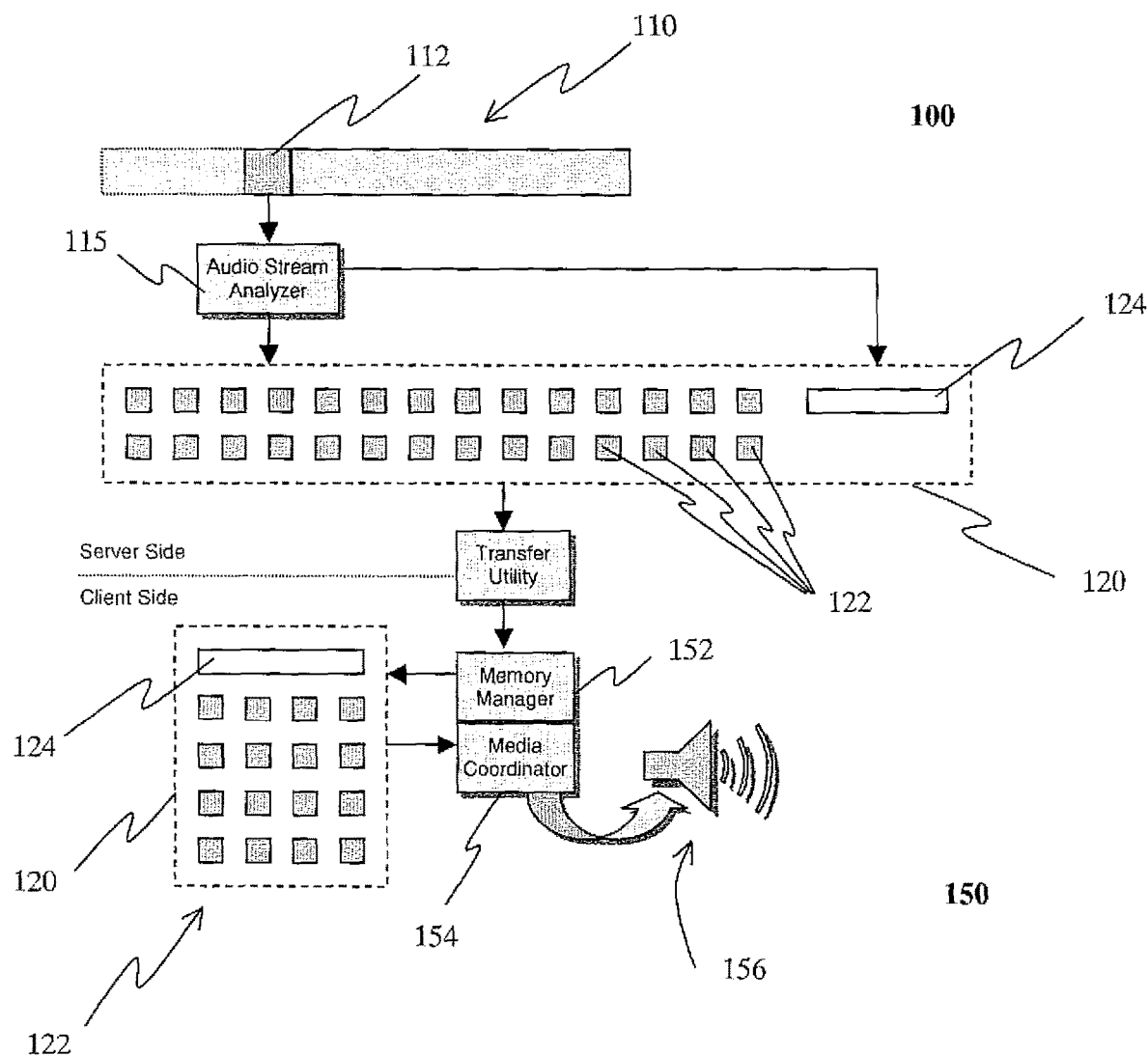
FIG. 3 is a schematic diagram illustrating the transmission of an audio stream in accordance with one embodiment of the instant invention.

Referring to FIG. 3, there is shown a system for transmitting digital audio data in accordance with one embodiment of the instant invention. The system includes a server 100, a client 150, and a network (not shown) for connecting the server 100 and the client 150.

On the server side 100, an audio stream analyzer 115 is provided for analyzing large digital audio files 110 frame by frame 112, and for segmenting the large digital audio files 110 into a plurality of small audio files 122. More specifically, the audio stream analyzer 115 locates areas of silence or low decibel levels, hereafter referred to as gaps, within the audio stream. When these natural language gaps are found, and after more than a specific amount of content has been processed, that content is written to a small audio file. This parsing process is repeated until the entire audio stream 110 has been split, or segmented, into the plurality of small audio files 122. In general, the size of each small audio file is selected such that it can be transferred from the server 100 to the client 150 in a period of time that does not cause appreciable consternation on behalf of the user. For example, as a benchmark for success, this time frame is similar to that used in the telephone industry when a subscriber lifts a receiver and waits for a dial tone. Accordingly, a two second wait is considered to be close to the maximum tolerable delay, with the optimal target being in the sub-second range. The actual size range of the small audio files 122 will be dependent on the network throughput rates. As a result, as network speed increases, the upper limit on the size of the segments will also increase.

The audio stream analyzer 115 also analyzes each small digital audio file to determine the start time, end time, and/or play time of the small digital audio file within the audio stream 110. This information is recorded in an index file 124 (e.g., an XML document). The index file 124, which is a virtual description of the actual audio stream, provides the information needed by a media player to reproduce the experience of a contiguous audio stream for the user without reconstructing the audio stream 110. The term 'actual audio stream' as used herein, refers to the plurality of small digital audio files that comprise the entire audio stream, and that when played sequentially, provide an apparently seamless audio experience. According to one embodiment, each of the small digital audio files is named using a number (e.g., eight-digit decimal number) that indicates its logical order in the actual audio stream.

In addition to providing actual stream details (i.e., the information for locating and managing the plurality of small digital audio files), the virtual audio stream descriptor 124 also typically includes descriptive details used to describe the content of the audio stream 110, such as the title and/or ISBN. Optionally, the virtual audio stream descriptor 124 also includes internal media marks, illustrations related to the audio stream, and/or internal advertising. Internal media marks are used to identify a specific point in time in the audio stream 110 that is offset from the beginning of the audio stream 110. More specifically, they generally point to a time offset associated with some user readable tag such as a table of contents, an index, a list of tables, a list of figures, footnotes, quotations, a list of illustrations, etc. Illustrations related to the audio stream and/or internal advertising may include graphics, static images, moving images, and/or other audio-visual content that is displayed for a fixed duration.

Figure 4:
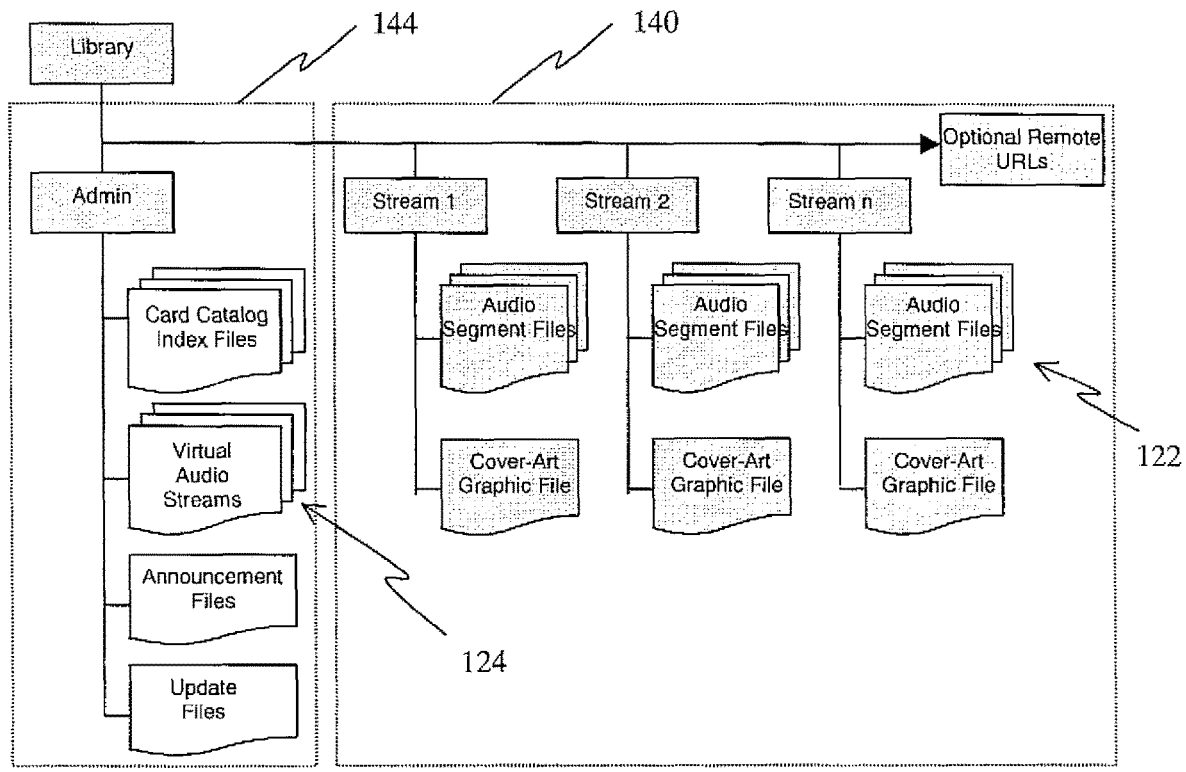
FIG. 4 is a schematic diagram of one embodiment of a network based library.
Figure 5A:
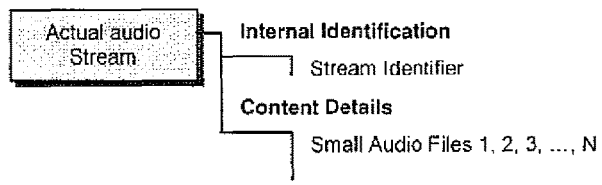
FIG. 5a shows an embodiment of an actual audio stream structure.
Figure 5B:
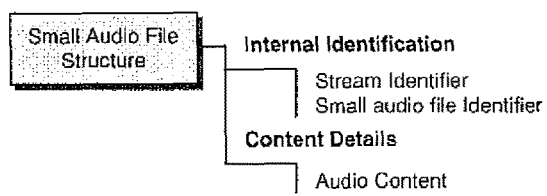
FIG. 5b shows an embodiment of a small digital audio file structure.
Figure 5C:
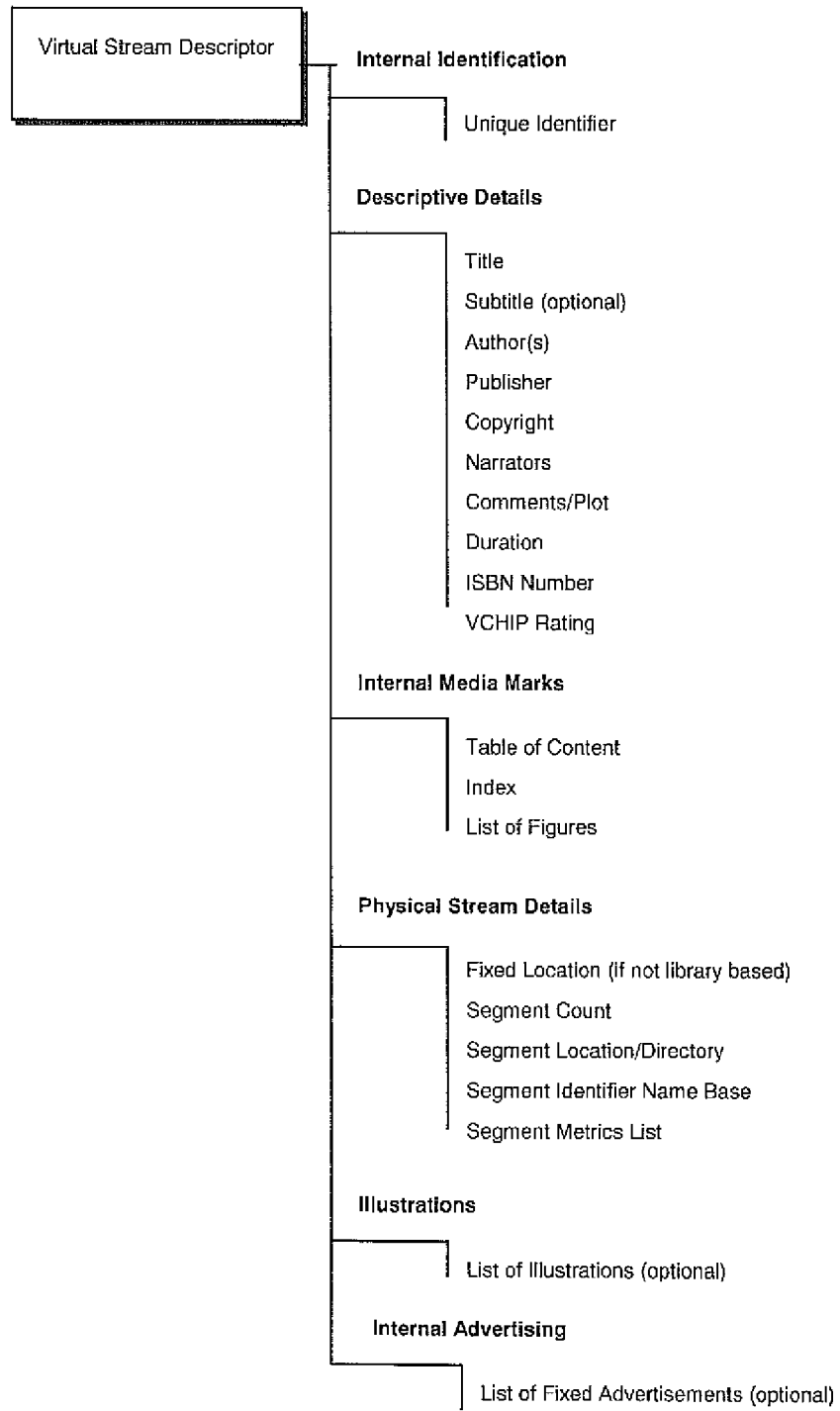
FIG. 5c shows an embodiment of a virtual audio stream descriptor structure.
Figure 5D:
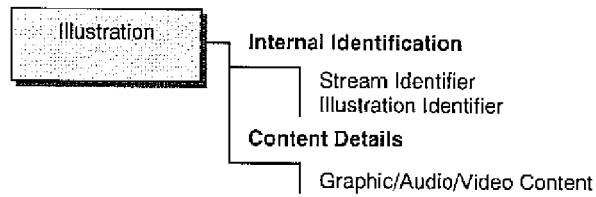
FIG. 5d shows an embodiment of an illustration structure.
Figure 5E:
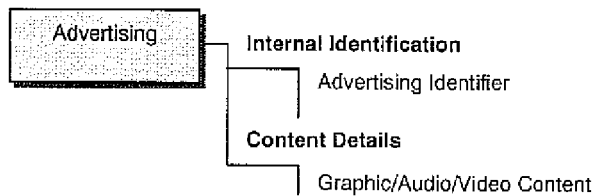
FIG. 5e shows an embodiment of an advertising structure.
Figure 5F:
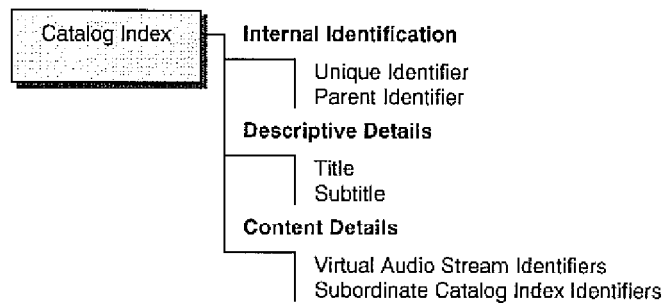
FIG. 5f shows an embodiment of a catalog index structure.
Figure 5G:
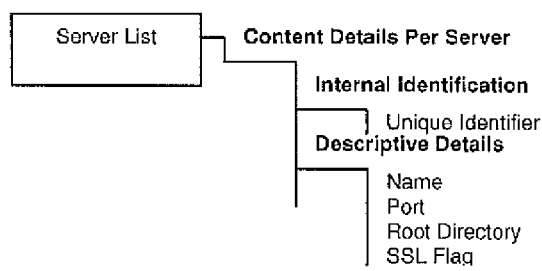
FIG. 5g shows an embodiment of a server list structure.

In general, the virtual audio stream descriptor 124 and the actual audio stream 122 will be stored together in a same location 120 on the server 100. For example, according to one embodiment the plurality of small audio files 122 and the virtual audio stream descriptor 124 are stored in a same directory of a library residing on one or more servers on the Internet. According to the embodiment illustrated in FIG. 4, the plurality of small audio files 122 and the virtual audio stream descriptor 124 are stored in the same library, but in different areas. More specifically, the virtual audio stream descriptors 124 are stored in an area for administrative files 144, whereas the plurality of small audio files 122 is stored in an area for actual audio streams 140. The area for actual audio streams 140 includes n directories for storing n audio streams, each with a corresponding cover art image. The cover art image, which is a graphic file, is intended to provide a user with a familiar look and feel of a book cover and/or to provide easy recognition. Optionally, one or more of the n directories is located at a remote URL.

The administrative files, which include the virtual audio stream descriptors 124, typically use the electronic equivalent of a card catalog to provide a simple, easy to use method of navigation and access of the actual audio streams. In general, these card catalog index files (e.g., XML documents) will include a hierarchical structure of cascading indexes that relate in various ways. For example, according to one embodiment the card catalogue will include indices based on keywords such as historical, detective, suspense, action, etc. The references contained in each index point to other index structures or to a specific virtual stream descriptor. Each index structure contains a reference to its parent index structure, thus allowing navigation in both directions (i.e., up and down the branch of hierarchy). Each media entry may appear within the structure of the entire index multiple times, to allow reference and/or navigation from many points. The structure of the index is such that endless navigation loops caused by circular definitions are not possible.

The administrative files also optionally include announcements, updates, and a server list (not shown). Announcements, which for example may be in an XML file, are typically informative or instructive in nature. The updates, which may include programs, data files, instruction files, setup files, and/or other text, typically contain information for providing a maintenance update. The server list (not shown), which may also be an XML document, typically contains a list of servers that are available on the network and that can provide general library and content information. In general, each server listed will be a mirror of the primary server (also included in the list).

Figure 6:
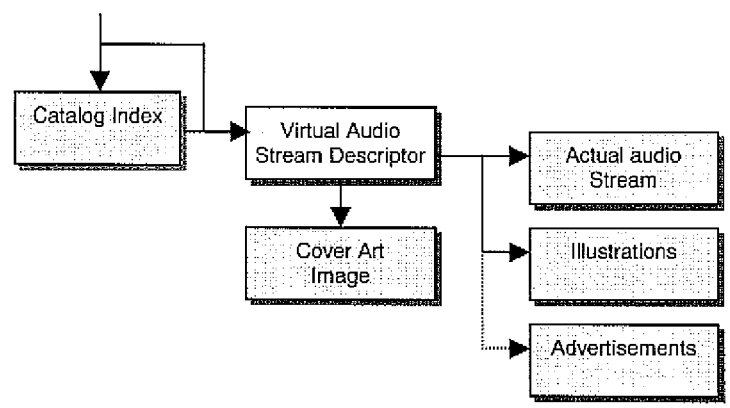
FIG. 6 is a schematic diagram showing card catalog index structure relationships.

FIGS. 5*a*-*g* show examples of data structures of: a) an actual audio stream, b) a small digital audio file, c) a virtual stream descriptor, d) illustrations, e) advertising, f) a card catalog, and g) a server list, respectively. FIG. 6, which shows the structure relationships, demonstrates that the actual audio stream, illustration, advertisement, and cover art image structure (not shown) are each referenced as a target structure from the virtual audio stream descriptor. Each of the actual audio stream, illustration, and cover art image structures also contain a reference identifier back to its parent structure. In contrast, the announcement structure (not shown) is functionally independent of other information bearing structures.

Figure 7:
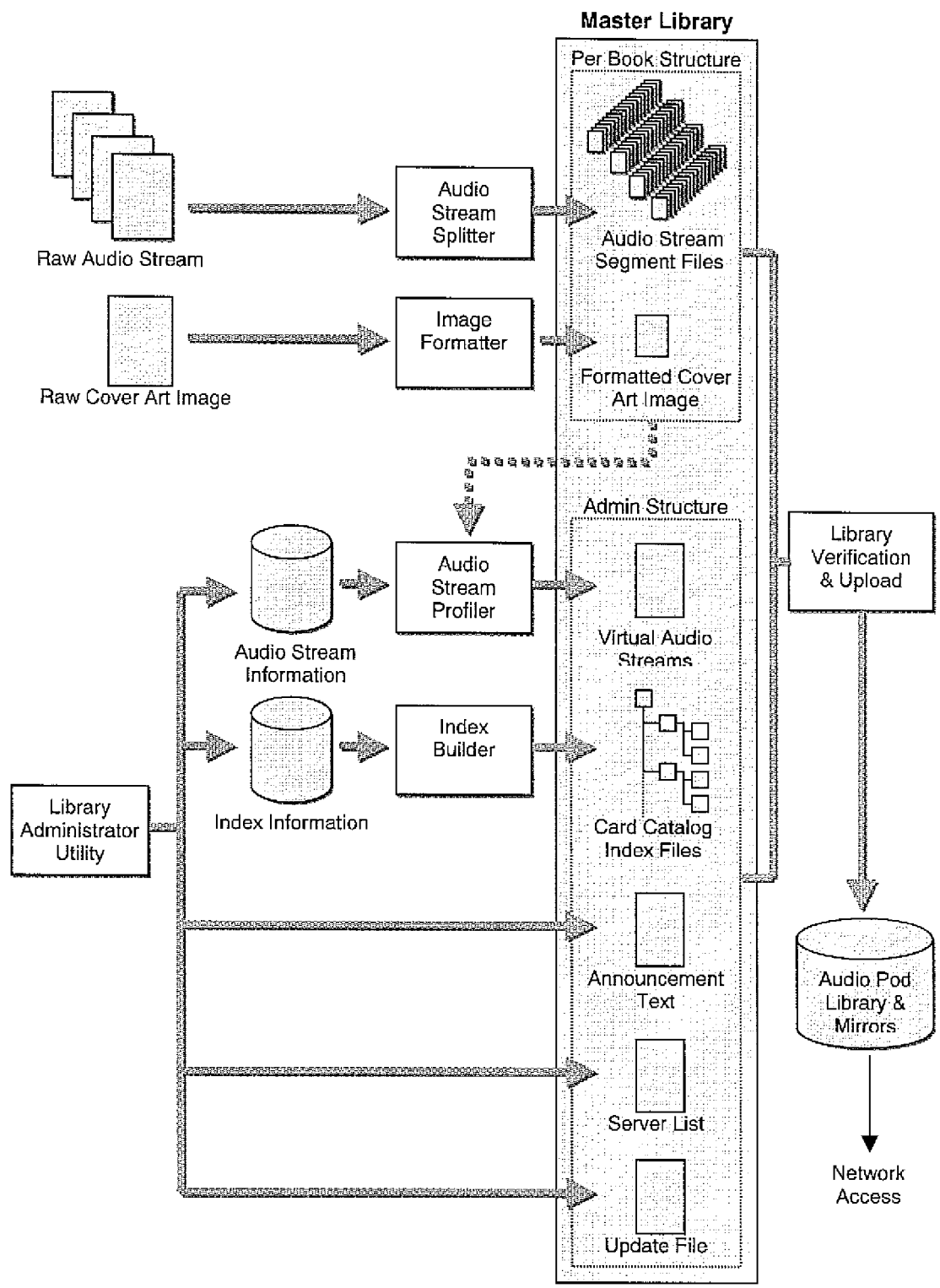
FIG. 7 is a schematic diagram illustrating one embodiment of a library creation process.

An embodiment of a process used to create an audio book library is shown in FIG. 7. The audio stream, in raw form, is acquired from either a publisher or is imported from an audio media or conversion routine. The raw files are analyzed using natural language gaps and are segmented into the plurality of small digital audio files (i.e., segment files) that form the actual audio stream. Book cover art is imported and formatted, if required. The plurality of small digital audio files and cover art image are placed in a unique directory, which is local or at some remote URL. Audio stream information that describes the audio stream is manually entered using the library administrator utility to create a virtual audio stream descriptor for each audio stream. Information that describes the location and structure of the actual audio stream is provided using the audio stream profiler. The administrator utility is also used to build a series of integrated index files that make up the card catalog for the library, and to provide tools to maintain updates, server lists and announcements. Preferably, this master library is replicated on a number of mirror sites that are also made available on the network. Following updates to the master library, an automated verification utility ensures that network accessible copies of the library (i.e., the one or more mirror sites) are also updated to ensure the integrity of the system.

Figure 8:
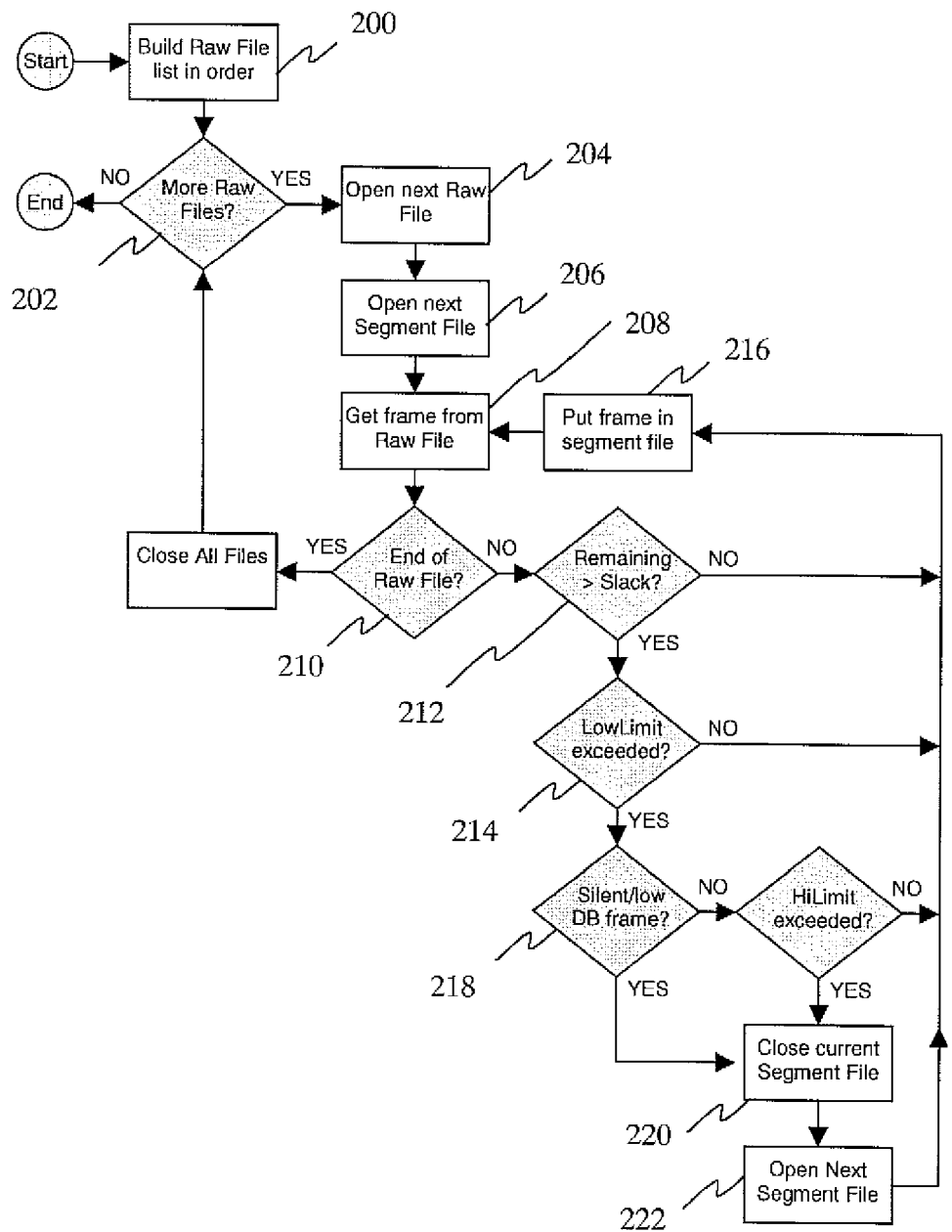
FIG. 8 is a schematic diagram illustrating one embodiment of an audio stream splitter process.

Referring to FIG. 8, the segmentation of the raw files is discussed in further detail. In a first step, 200, the list of original raw audio files is built in logical order. These files are processed one at a time. More specifically, after confirming the existence of a raw file 202, the raw file is opened 204, a segment file is opened 206, and a frame is obtained from the raw file 208. Assuming the frame does not correspond to the end of the raw file 210, and that the segment file has not reached an arbitrary minimum size 214 (e.g., 100 kilobytes), the frame is written to the segment file 216. After this limit is reached, audio frames are analyzed looking for a period of silence or low decibel levels 218. If this period of silence is found, or if the upper size limit (e.g., 250 kilobytes) of the segment file is exceeded, the current segment file is closed 220 and a new output small audio file is opened 222. In the event that the unprocessed raw file content is less than a slack limit 212 (e.g., 25 kilobytes), the testing for silence and the upper limit testing is not performed and the remaining audio frames are written to the then current segment file. According to one embodiment, this method is used to find periods of silence between chapters, paragraphs, sentences, phrases, words, and/or at punctuation marks. Optionally, the audio stream splitter/analyzer 115 searches for long periods of silence, which are subsequently truncated. For example, periods of silence that exceed 2 seconds in length have been found to make users assume that a problem exists in the delivery or replay of the audio stream. In order to eliminate these user concerns, periods of silence that exceed 2 seconds in length can be truncated, and the audio content that has been truncated, discarded.

Referring again to FIG. 3, the client side includes a memory manager 152, a download manager (not shown), a media coordinator 154, and a media player 156. The memory manager 152 is a complex memory manager used to maintain the integrity of the actual audio stream, which is transferred from the server 100 to the client 150 using a standard transfer utility (e.g., FTP). The function of the memory manager 152 is to ensure that there is sufficient memory available to receive large numbers of small digital audio files, to ensure that sufficient audio content is available when needed, and to ensure that a quantity of already heard audio content is maintained (e.g., so a user can rewind the audio stream to review recently heard content without repeated downloads). The download manager is responsible for obtaining the small audio files that make up the audio stream. The media coordinator 154 delivers the plurality of small digital audio files in the appropriate order to the media player 156. The memory manager 152, download manager (not shown), and media coordinator 154, are all part of an integrated, network-based software product used to control the media player 156.

According to one embodiment, the software product is a user-friendly interface that allows the user to select an audio stream, to download a small digital audio file representing a selected part of the selected audio stream, to play the small digital audio file relatively quickly (e.g., within 2 to 5 seconds), and to download and play the logically next small digital audio file such that the transition between successive small audio files is apparently seamless.

According to one embodiment, the software product includes computer-readable code that allows the user to use a plurality of navigation buttons to access a network-based library card catalog, bookmarks, cover art images, and/or announcements/updates. As discussed above, a network-based library card catalog, which may index audio streams in a hierarchical fashion such that there are many possible paths to reach a single audio stream, is typically stored on a network-based library for the navigation thereof. According to one embodiment, once the navigation button for the card catalogue is selected the user is able browse through a series of keywords describing a plurality of audio streams, to select an audio stream from the network based card catalogue, to load a profile of the selected audio stream, and/or to download the selected audio stream. According to one embodiment, the profile includes information obtained from the descriptive details entered into the virtual audio stream descriptor.

Bookmarks are external media marks (i.e., external to the virtual audio stream descriptor) that allow the user to identify and/or access an audio stream at any point within that audio stream. Similar to internal media marks, each bookmark provides a time offset from the beginning of the audio stream. In other words, if an audio stream starts at time zero and continues for some elapsed time to a maximum duration, the bookmark identifies a specific point in time in the audio stream that is offset from the beginning of that audio stream. The bookmark also identifies and/or points to the virtual audio stream descriptor of the target audio stream (e.g., in a local directory or at some network address). Using the time offset and the information in the virtual audio stream descriptor, the software product is able to select the appropriate small audio file to be played. Moreover, the exact position within the small audio file can also be calculated as a local offset to ensure correct positioning within that small audio file.

Figure 9:
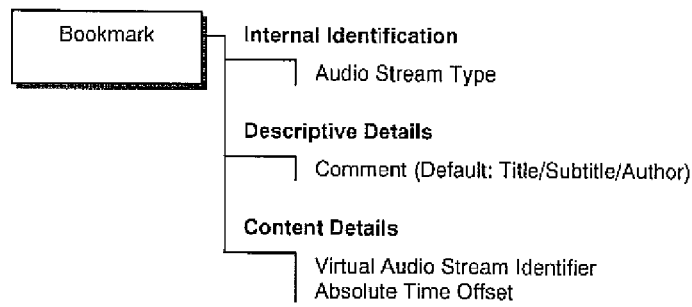
FIG. 9 shows an embodiment of a bookmark structure.
Figure 10:
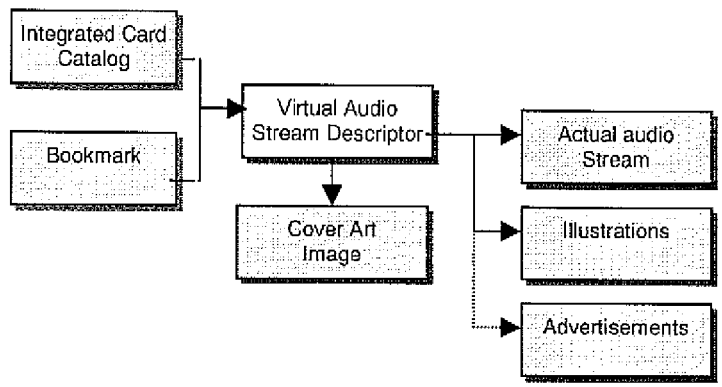
FIG. 10 is a schematic diagram showing virtual audio stream structure relationships.

Bookmarks are typically, but not always, created by the client software. For example, if the media player is stopped in the middle of an audio stream, a bookmark is created and stored. Alternatively, the user creates a bookmark using a 'make bookmark' command. More than one bookmark may be created for each audio stream. The bookmark identifies the bookmarked audio stream and the time offset of the bookmarked position. Optionally, to assist the user of the audio stream in 'picking up where you left off', a predetermined time (e.g., 30 seconds) is subtracted from the time offset of the bookmarked position and stored as the new time offset Optionally, the predetermined time is listener selectable. FIG. 9 shows an example of a data structure for an external bookmark, whereas FIG. 10 illustrates the structure relationships. Notably, the virtual audio stream descriptor may be addressed from either the integrated card catalog or the bookmark. Optionally, the virtual audio stream descriptor is addressed in another manner.

Since the bookmark only contains references to the audio stream, and does not contain any part of the audio stream itself, the bookmark can be transferred from client to client or from server to client without violating the copyright of the work product contained within the audio stream. For example, a user can bookmark an audio stream at an interesting point and e-mail that bookmark to friends without violating copyright. Clearly, the ability to position an audio stream at some arbitrary point without the need for that media to be resident provides great flexibility. Moreover, the nature of the bookmark makes it independent of the physical structure of the audio stream. This allows changes in media and format without corrupting the integrity of the mark or the audio stream. Examples of such changes include changing bit and scan rates in MP3 files, changing from MP3 to .wav format, changes to the actual audio stream, small audio file structure, and/or reformatting of the audio stream itself. According to one embodiment, the bookmark is an XML document.

The bookmark navigation button allows the user to view a list of bookmarks corresponding to open audio streams (e.g., a book that has been accessed and partially read), to select a bookmark, and to play the audio stream at the bookmarked position. For example, the software product may list the bookmarked audio streams in the descending order of the date and time that the audio steam was last read.

According to one embodiment, the software product includes computer-readable code that allows the user to use a plurality of standard player control buttons to begin playing the audio stream, stop playing the audio stream, and/or fast forward within the audio stream. Notably, the rewind and fast-forward control buttons do not actually act on the audio stream. Rather, these two functions are used to advance or retard the time offset that indicates the then current position in the audio stream. For example, rewind will cause this offset to decrease to a minimum of zero (e.g., seconds), whereas fast forward will increase the time offset to a maximum of the upper limit of the audio stream duration. Accordingly, the user is able to fast forward and rewind through the audio stream, even if the audio content is not resident. In particular, after the time offset has been adjusted to where the user desires, if the relevant small audio file is not resident, it is obtained from the library, again in the 2 to 5 second range. The small audio file is then loaded, positioned and played.

According to one embodiment, the software product includes computer-readable code that provides a number of different displays, including for example, a basic display, an introduction display, a bookmark display, a library card catalog display, a book details display, a book player display, and a book cover display. These displays provide appeal and/or familiarity to the user. For example, the basic display may provide a decorative skin or frame to standardize the appearance of the software product when played on different platforms (e.g., desktop, laptop, personal data assistant, cell phone, dedicated device, etc), whereas the introduction display may appear during the start up of the program. Other displays, such as the bookmark display, library card catalog display, and/or book details displays may provide the navigation buttons. The book player display may show the book that is currently loaded into the player, the book title, author, copyright, and/or book length. The book player display may also provide the standard player control buttons discussed above. Optionally, the book player provides a content level indicator, which is a measure of the amount of continuous content that is resident beyond the current position in the book, and/or a positive feedback feature, which is used to inform the user that the player is active. According to one embodiment, the navigation and/or control buttons are selected using standard data entry techniques, which for example, may use a mouse, keyboard, touch pad, and/or touch sensitive screen. If the latter is provided, a virtual keyboard is typically provided.

According to one embodiment, the software product also provides a number of other displays including a set-up display, a notes display, a quotations display, and/or a contact list display. The set-up display allows the user to enter/change user account name, password, default server information, DNS name of server, communication ports of the server, and/or secure sockets. The notes display allows the user to enter or select personal notes, which may be edited and/or e-mailed to other clients. In general, the note file may include a unique numerical identification of the audio stream, a tag to the audio stream, a user defined title, comments, the author of the comments, and/or the date and time the note was created. The quotation display allows the user to enter or select various quotations, which may also be edited and/or e-mailed to other clients. In general, the quotation file may include a unique numerical identification of the audio stream, the start and end point of the quotation in the audio stream, a user defined title, and user defined comments. The contact list display allows the user to maintain a list of names and e-mail address used by the software product.

According to one embodiment, the software product includes computer-readable code that provides client-based performance management. The performance level of the digital audio data delivery is an important factor in ensuring the integrity of the audio stream available to the user. The purpose of client-based performance management is to ensure that the client software receives service at or above minimum levels. According to one embodiment, this service is automated and is provided transparently to the user utilizing any then current available network resource to do so. In other words, the user is not aware of the source of the service or the mechanics of accessing that service.

For performance management purposes, the client software views the network and library server as a single entity. To ensure performance levels, the client software maintains statistics for service level for each library server. These server statistics are used when attempting to find the historically fastest server. This file is created and maintained in the client only. If service levels fall below a minimum acceptable level, the client software goes through the list of servers described above to determine which server has the best historical record of service. The client software selects this new server as the primary provider. Notably, using performance management may result in the user receiving small digital audio files from more than one server for the same audio stream.

Figure 11:
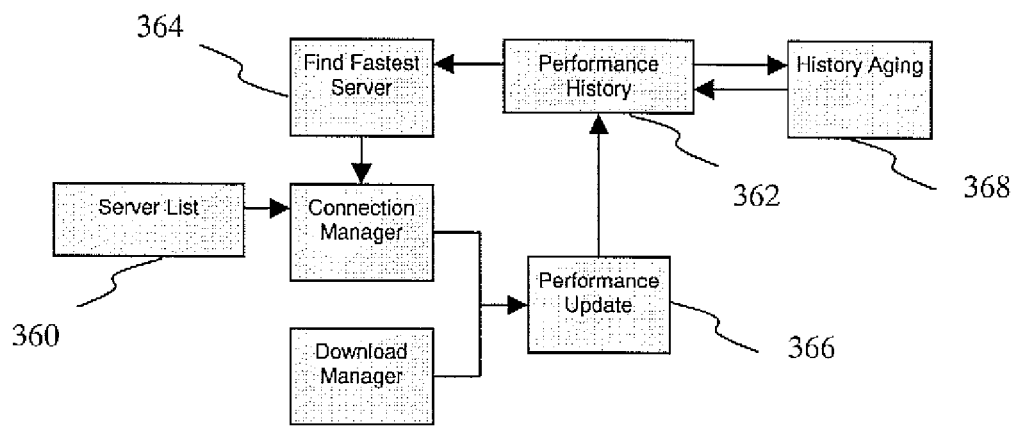
FIG. 11 is a schematic diagram illustrating one embodiment of a performance management process.

The performance management logic is built into lower level functions that perform various network and library based functions. These include 1) Logging in to a server; 2) Obtaining a file from the server; 3) Obtaining file size and creation dates. Referring to FIG. 11, the initial steps taken by the client software are to load the list of servers 360 available for use and the historical transfer statistics 362. The fastest server from the list is then selected 364 as the primary server. If the server is not available or fails to respond, the next fastest server is selected. The process continues until a server is reached. If no servers are available, the default server entered is used. Servers that are found to be slow or are continually in error will have their transfer rate increased based on one of two values 366. The value is either the total elapsed time of the transaction with the server or an error value equal to a predetermined transaction delay (e.g., one minute). As time goes on, these operational statistics are aged 368 to reduce the effect of errors or network delays. Servers are slowly aged until such time as their statistics are not less than the average for all servers. The result of the aging process means that, assuming no additional delays or errors, the operational average will decrease to some baseline average that will be greater than the fastest servers but still make the aged servers available in the future. With the then current fastest server established, that server is used as the target of all library operations. A connection must be established to the network in order to communicate. Each operation including, but not limited to login, get file and get file size are timed to see how long each transaction takes. This testing is built right into the lower level logic of the client software. In the event that a server is failed out as a result of error or degradation, a new server is selected to take its place. This server replacement occurs in the same manner that is customarily used for a non-fatal error. That is, the transaction is retried following the server replacement process without the upper levels of client software logic or the user becoming aware that it has occurred. In this way, the client software is able to balance network and server loads on the basis of performance without intervention from any other level.

According to one embodiment, the software product uses a universal ISBN server, which is designed to provide a simplified means to locate network-based library services from one or more suppliers on a network. The ISBN server may be located on the Internet for global access or on various intranets for use by various public or private organizations. The purpose of the ISBN server is to receive a request from a client device and return a list of one or more servers. The request from the client device will include a unique ISBN number or other unique identifier. The ISBN server will look up the unique identifier in a preloaded database and assemble or extract a list of servers capable of supporting library services for that identifier. This list is then returned to the client device. Upon receipt of the list of library servers, a selection is made from that list as the preferred provider of library service (e.g., as discussed with regards to client based performance management). The selected server is then accessed to acquire the virtual audio stream descriptor that goes with the unique identifier originally provided by the client.

Preferably, the software product, including the computer-readable code, is stored on a computer readable storage medium on the client side 150 of the system. The computer readable code is then used to access information structures and files that reside on one or more servers on the server side 100 of the system (e.g., within a server farm). Information transfer from client to server is accomplished using industry standard server software, tools and utilities. A summary of various types of information, structures or files is provided in Table 1.

TABLE 1

Various types of information, structures, and files

| Information Type | Content |
| --- | --- |
| Administrative | Contains information, structures and files that are used to facilitate access to media contained within the library and maintain the operational environment status of the client software. |
| Announcements | Contains announcements that could be used in a number of ways, typically to inform users and keep them up to date on current or upcoming events or news. |
| Server List | Contains the primary server site and a list of library mirror sites capable of maintaining audio stream continuity for the consumer in the event of degraded or interrupted service. |
| Performance History | Contains a list of historical throughput performance and failure rate metrics for the library primary and mirror sites. Present only on the client platform. |
| Updates | Contains the actual files and information needed to perform network-based updates while online using automated routines provided. |
| Catalog Index | Contains the cross-reference information needed to access subordinate catalog indexes and to access virtual audio stream descriptors. |
| Virtual Reference | Contains information, structures and files used to provide access to and delivery of specific audio streams. |
| Bookmark | Contains the information needed to restart a specific audio stream at a specific point. |
| Virtual Audio Stream Descriptor | Contains the information that describes all aspects of an audio stream and the information needed to access and use the actual audio stream. |
| Cover Art Image | Contains a graphic or image that is used to represent the entire audio stream to the user in their own mind similar to the task accomplished by the cover art graphics on a printed book. |
| Actual audio | Contains the actual media content and supportive graphics and/or audio/video content |
| Actual audio Stream | Contains one or more small audio files that comprise the entire audio stream and that when played in order form a seamless audio experience. |
| Illustrations | If present, contains one or more graphic, image, video or audio/video portions of multimedia content intended for use with and in support of the actual audio stream. |
| Ancillary | Contains other information, structures and files used in the delivery of content not considered actual content within audio streams. |
| Advertisements | If present, contains one or more graphic, image, video or audio/video portions of multimedia content intended to be used before, during and after presentation of any audio stream subject to the requirements described in the virtual audio stream descriptor. |

Figure 12:
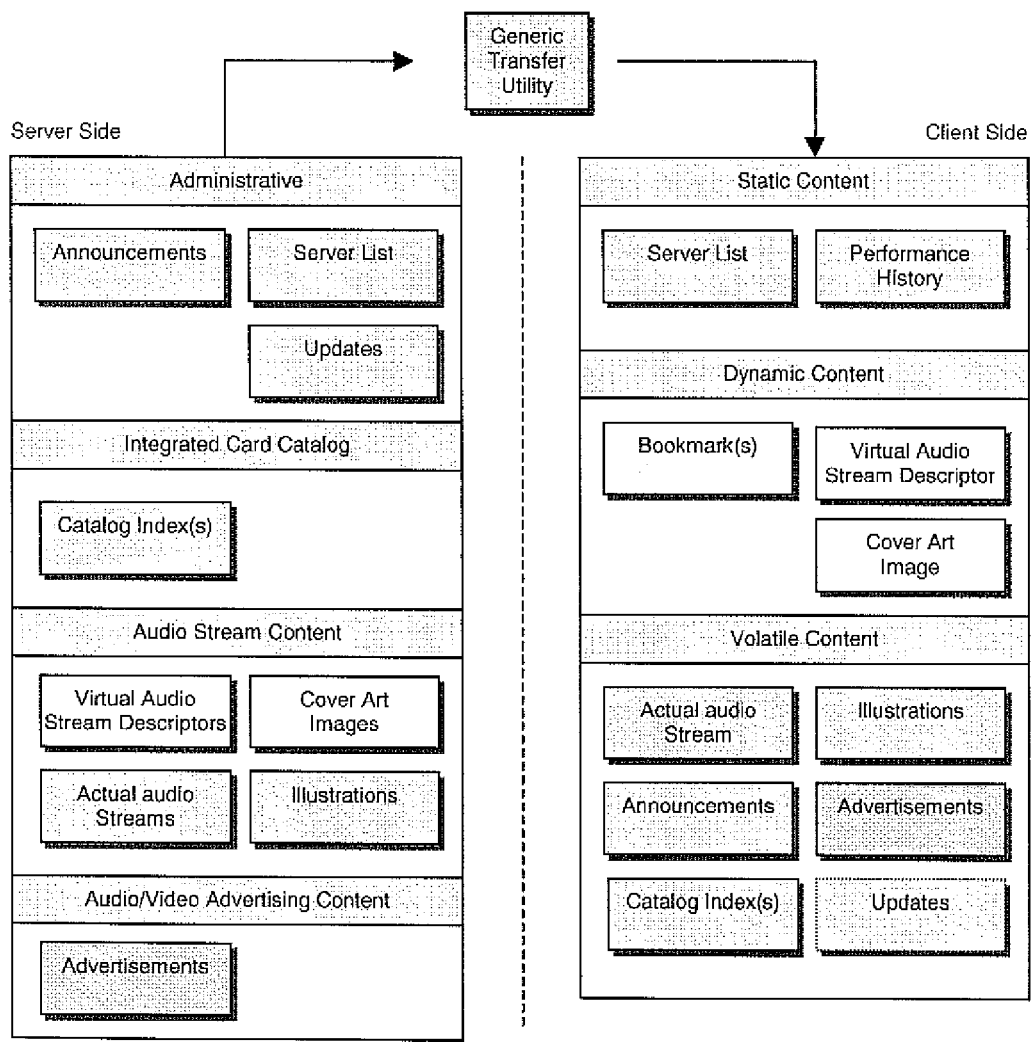
FIG. 12 is a schematic diagram illustrating information transfer and client memory status.

FIG. 12 shows the information, structures and files contained on the server side generally grouped by function. The same information, structures and files are grouped differently on the client side and, in particular, are grouped by their requirement for retention. More specifically, this schematic diagram illustrates that as information is transferred from the server to the client, it is typically organized based on the priorities defined for the memory manager. The structures used are considered more or less expendable subject to their content. Static structures contain information needed to establish and maintain connections with the servers on the network. The term static indicates that the structures, once defined, remain in place although the content thereof may change. The memory manager will preserve these structures at all costs. The volatile structures include those whose existence is short lived. The memory manager will balance the need for space with the need to retain content surrounding active bookmarks. As the demands for space increase, the content surrounding bookmarks becomes less and less. The structures that are considered dynamic are semi-permanent structures that typically exist for the duration that an audio stream remains open and bookmarked. The memory manager will make every effort to ensure that these structures are preserved, but may remove them as a final option to obtain space. Typically, the last structures to be purged are the oldest bookmark structures.

According to one embodiment, the static files are contained in a root directory, while the volatile files are contained in a spooler directory. A list of possible static and/or volatile files that may be used by the software product is provided in Table 2.

TABLE 2

List of Possible Static and Volatile Files

| Filename(s) | Contents |
| --- | --- |
| Static Files | |
| Audio Pod Directory | The directory that contains all files that are static in their existence |
| Spooler Directory | The directory that contains all files that are volatile in their existence |

TABLE 2-continued

List of Possible Static and Volatile Files

| Filename(s) | Contents |
| --- | --- |
| AudioPod.exe | The Audio Pod executable image |
| AudioPod.xml | The Audio Pod startup initialization file; in XML format |
| UpdateManager.exe | The Audio Pod Update Manager executable image |
| ServerList.xml | The list of libraries, mirrors and servers that are available on the network as targets for the Audio Pod Performance/Load manager; in XML format |
| ServerStats.xml | The historical rate of response statistics for all library servers; in XML format |
| BookMarks.xml | The list of active bookmarks; in XML format |
| TheEnd.mp3 | The audio stream to be played on completion of an audio stream (book) |
| ErrorAlert.mp3 | The audio stream to play when the Audio Pod must attract the attention of the user while listening to another audio stream (book) |
| Volatile Files | |
| Small Audio Files | Audio files that make up the various open audio streams (book); in MP3 format |
| Cover Art Graphic Files | Graphic files that contain images of book covers; in jpg graphic format |
| Card Catalog Index Files | Files containing Card Catalog indexes; in XML format |
| Book Profiles | Files containing Book Profiles; in XML format |
| Announcement File | File containing a notice or announcement; in XML format |
| Update File | File containing components needed to perform an update to the Audio Pod and/or any of its components |

As discussed above, a memory purge process is used to remove volatile files to ensure that a requested level of free memory is made available. This process works directly on the contents of the spooler directory. The purging process takes different approaches when dealing with the active audio stream, bookmarked audio streams, and ancillary or support files. A demand for a significant quantity of memory is made at the opening of a new audio stream, or reopening a bookmarked audio stream. The size of the demand is subject to the ultimate size of memory available, the size of the audio stream being accessed and the volume of content from the subject audio stream that may already be resident. In the event that sufficient memory is not available, memory is purged in the following order.

1. Ancillary or support files that are considered volatile are removed from memory.
2. Virtual audio streams, supporting files and related audio content for any audio stream for which there is no bookmark are deleted.
3. Bookmarked audio streams are purged with increasing levels of severity until the memory demands are met.
4. The content of dynamic memory including virtual audio stream descriptors, and supporting files are deleted, starting with the oldest.

Figure 13:
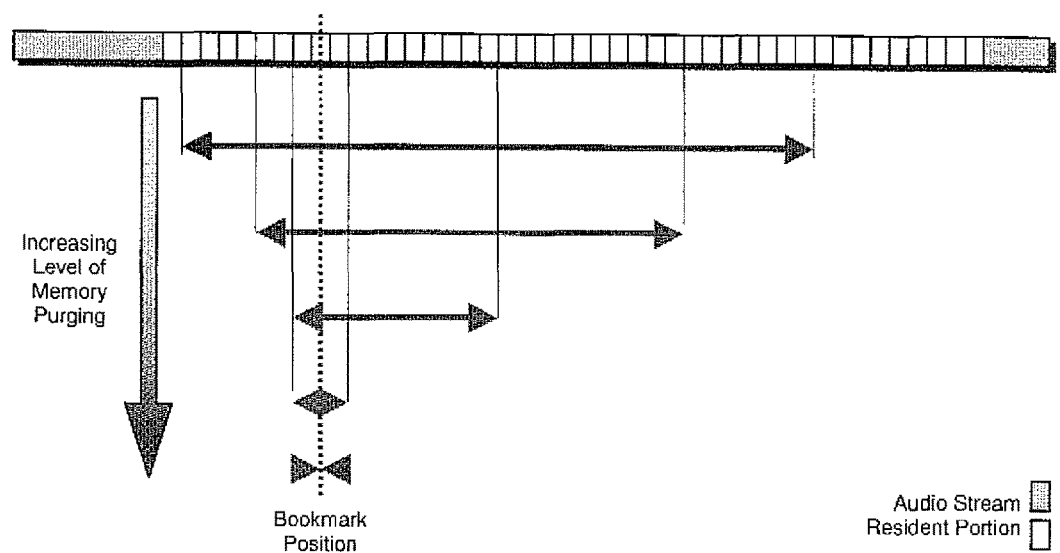
FIG. 13 is a schematic diagram illustrating one embodiment of a bookmarked audio stream purge process.

When purging bookmarked audio streams, the purging process attempts to retain as much resident content as is possible. The purge process focuses on the bookmark position within the audio stream. Some resident content is retained within the audio stream preceding the bookmarked position. This is to allow the user the ability to rewind the audio stream in an attempt to pick up where they left off. However, this quantity of content is not large and generally will not exceed 5 minutes. The main effort is to preserve as much resident content of the audio stream that follows the position. In order to satisfy the demand for memory, most, if not all, bookmarked audio streams will have some future content purged. In the event that sufficient memory cannot be obtained with an initial purge of content, the level of severity of the purge will be increased and the purge process repeated. The volume of resident content in the bookmarked audio streams is reduced. This reduction is most severe in content preceding bookmarked positions. As the levels of severity increase further, the quantity of content preceding the bookmarked positions prevents further gains through purging, and content that follows the bookmarked positions is aggressively purged. The purging process continues, reducing the quantity of content surrounding bookmarked positions until, at the ultimate extreme, no content remains. Under normal circumstances, the demand for memory will be met and this situation is expected never to arise. This process is shown in FIG. 13.

Figure 14:
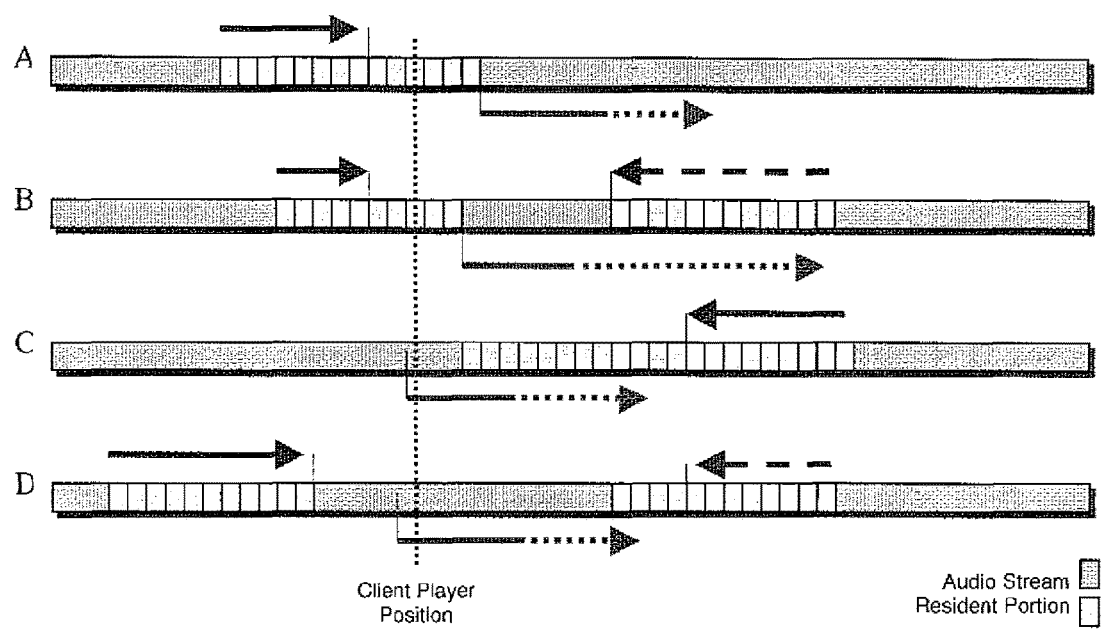
FIG. 14 is a schematic diagram illustrating one embodiment of an active audio stream purging process.

When the demand for memory is met, the selected audio stream becomes the focus of the purging process. The effort becomes one of ensuring that sufficient content is maintained around the current player position to ensure a continuous replay of the audio stream. As the player position approaches the end of available resident content, the current audio stream is purged to make room for additional content. Every attempt is made to preserve some content preceding the current player position to allow the user to rewind a few minutes to pick up the story in the event of interruption. Referring to FIG. 14, A shows the normally expected state of memory with already heard content purged and future content loaded as the player position approaches the end of resident content, whereas B-D shows the state of memory that may result when internal media marks, external bookmarks, rewind, or fast forward functions are used. In these situations, the media player position may be outside of resident content or may result in a discontinuity of resident content. In each situation, the content that precedes the current player position typically is purged prior to purging any content that follows the current player position.

According to one embodiment of the instant invention, a method of using the software product to transmit digital audio data is described as follows. A user selects an audio stream. Examples of audio streams include audio books, magazines, newscasts, radio shows, lectures, museum tours, etc, or parts thereof. The audio stream typically is selected from a card catalog, a bookmark, or other means. In general, the actual audio format of the sound information is not important.

Once an audio stream has been selected, a demand is raised to the memory manager for enough space to work with the virtual audio stream descriptor (e.g., about 250K bytes). In normal operation, this quantity of memory is routinely expected to be available resulting in no action taken by the memory manager.

The software product ensures that the virtual audio stream descriptor has been downloaded. More specifically, the volatile memory is checked for the existence of this structure and, if it is not resident, it is downloaded. A demand is then raised to the memory manager for the lesser of two quantities of memory. The first value is 75 percent of available memory. The second is the ultimate size of the actual audio stream minus the amount of any memory currently consumed by any small audio files that may already be resident.

The desired position within the actual audio stream is then ascertained. The default position is assumed to correspond to a time offset of zero. If the method of selection was a bookmark, or an internal media mark, then the offset position is obtained from that structure. The offset is validated to be in the range from zero to the maximum duration of the audio stream, a value obtained from the virtual audio stream descriptor. The time offset is compared against the list of small audio file metrics stored in the virtual audio stream descriptor. When the time offset falls between the start and end times of a specific small audio file, that small audio file is identified as the target small audio file. A local time offset is calculated by subtracting the start time of that small audio file from the time offset that was the subject of the search. This local offset is retained for use when positioning the target small audio file.

If the target small audio file is not resident, then it is downloaded. The small audio file is loaded into the media player and the media player is positioned to the calculated local time offset. When the media player is started, the download manager is signalled to commence operations. The download manager purges the current audio stream and then examines the virtual audio stream and the content of volatile memory. Small audio files are downloaded sequentially. When the end of the audio stream is reached, downloading stops. If memory is exhausted and the download manager indicates that enough continuous audio content is resident, downloading stops. Otherwise, a demand for additional memory is raised with the memory manager, and the process is repeated.

As the media player advances through the audio stream, the small audio files are successively loaded and played until the end of the audio stream is reached. The current position in the actual audio stream is tracked. If the current position in the actual audio stream approaches the end of resident audio content and the entire audio stream is not downloaded, then the current audio stream is purged to make memory available for new content, and the download manager is started. New content is downloaded until the end of the audio stream is reached or memory is exhausted. This process is repeated as often as is necessary. In this manner, the software product can process complete audio streams that exceed the size of memory available.

The small audio files are contained within a common spooling area. As the spooling area fills with small audio files, the quantity of unheard audio increases. This quantity is displayed to the user. As a result, the user can continue to play resident unheard small audio files even during periods when out of network contact with the library. The memory manager will detect when network service is restored and continue processing as normal.

If the media player is stopped, a bookmark is created and stored. The bookmark identifies the audio stream and the time offset of the bookmarked position. The offset value stored is the current position in the audio stream less an arbitrary time. This allows the listener to 'pick up the story' when the listener resumes the current audio stream. If the listener changes the time offset into the audio stream using the rewind and fast forward buttons, or any of the media marks that may be available, the new offset position is used to position the audio stream as described above.

When the end of the audio stream is reached, any bookmarks are removed from dynamic memory. Without a bookmark, the memory manager will purge the audio stream and all references at the next signal to commence operations.

This approach allows many audio streams to be opened and bookmarked at one time. Given the actual size of these large audio streams, it will be necessary to have a memory manager capable of ensuring sufficient space is available for the most active audio streams while preserving as much physical content surrounding active bookmarks as is possible. The need to preserve actual audio content around bookmarks becomes clear when considering levels of degradation associated with the acquisition of content across the network. The ultimate goal is to have as near zero delay as is possible when resuming rendering of an audio stream. Retaining sufficient media allows audio streams to start virtually instantly, and then acquire media content as needed.

Figure 15:
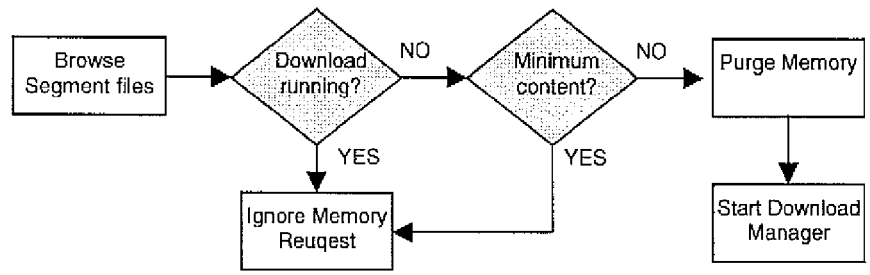
FIG. 15 is a schematic diagram illustrating one embodiment of a memory manager process.

FIG. 15 provides an overview of the memory manager process in greater detail. When activated, the memory manager first checks to see if there is sufficient audio content already resident (e.g., enough for about 5 minutes play time). If there is enough content, the remainder of the audio stream is resident or the download manager is running, then no action is taken. Otherwise, the memory manager purges the content of the audio spooler directory with the goal of freeing a specific amount of memory. With memory available, the memory manager signals the download manager to commence operations.

Figure 16:
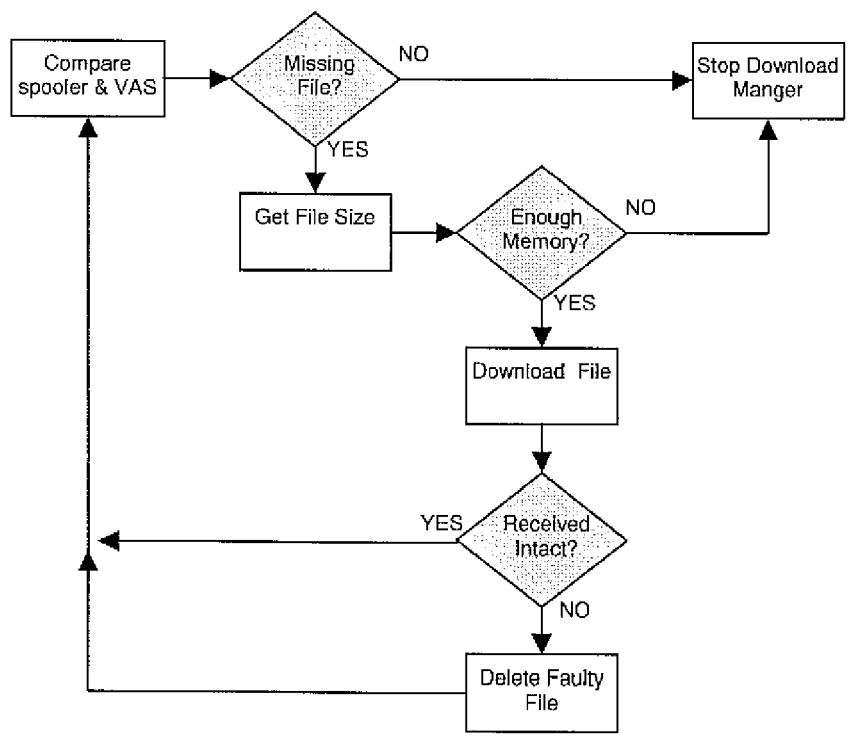
FIG. 16 is a schematic diagram illustrating one embodiment of a download manager process.

FIG. 16 provides an overview of an embodiment of a download manager process. The contents of the spooler directory are compared with the virtual audio stream descriptor and the user's current position in the audio stream. In particular, the spooler content is examined for the first small audio file that is needed to make the audio stream continuous beyond the then current position in the audio stream. If this file is missing, its size and the amount of available memory is obtained. This small audio file is then downloaded and the integrity of the file verified for size. The download manager continues to run until either memory is exhausted, or the end of the audio stream is reached. If the player is stopped while the download manager is running, the process stopping the player will stop the download manager.

Figure 17:
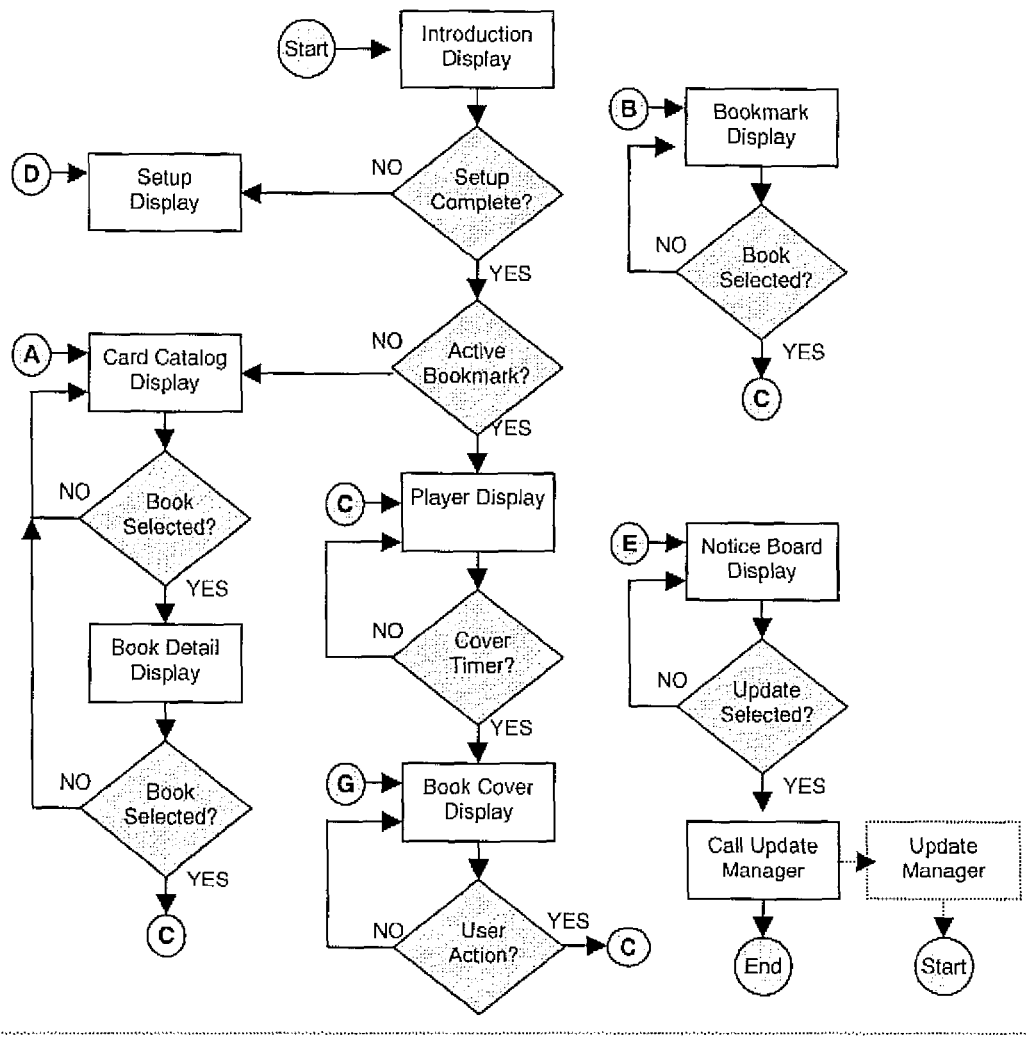
FIG. 17 is a flow diagram illustrating one embodiment of a process for using the software product.
Figure 17:
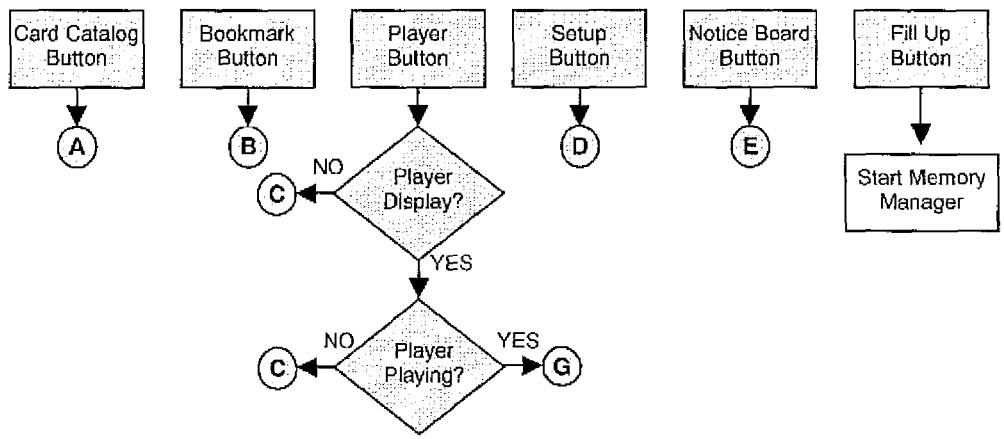
Figure 18:
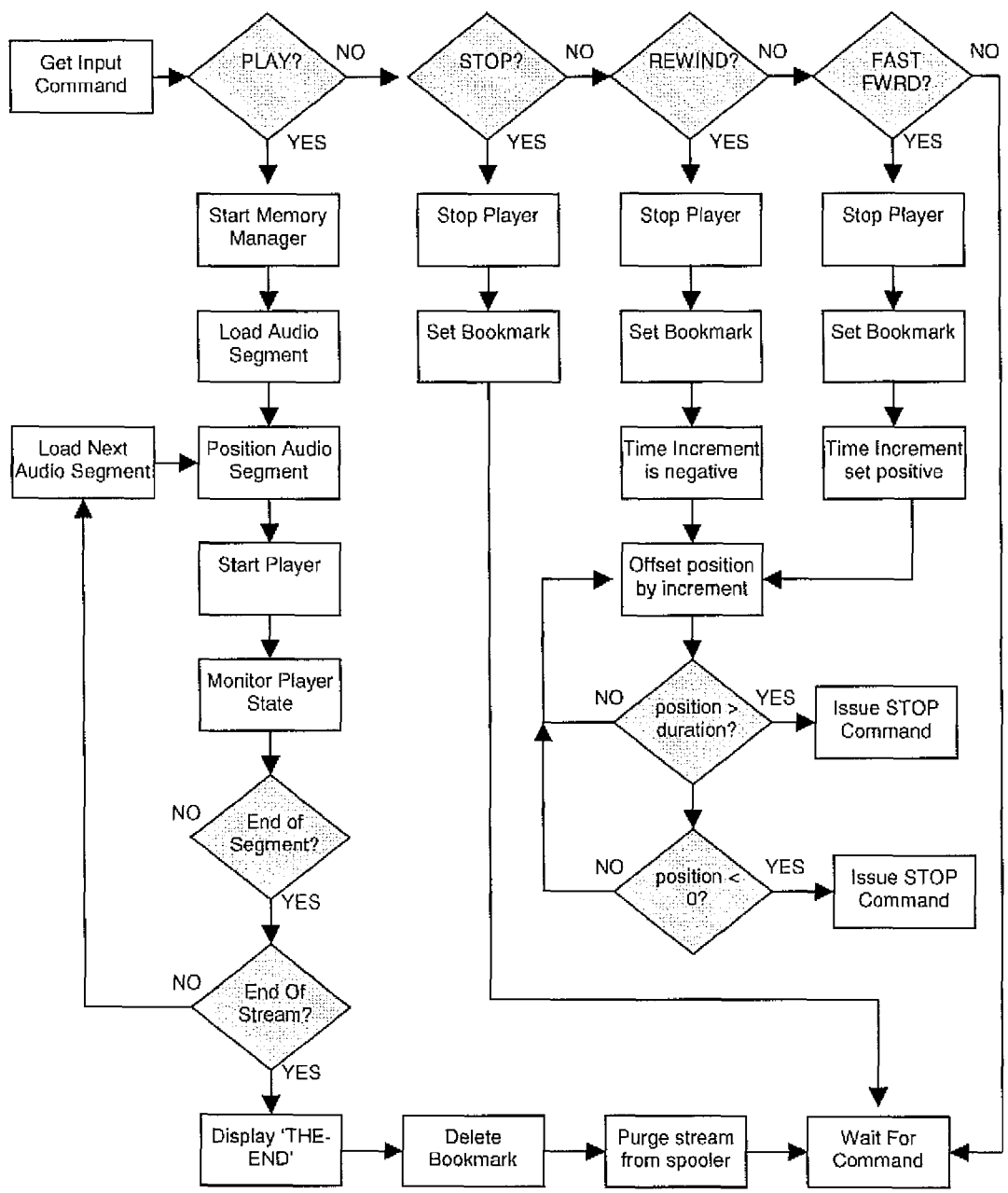
FIG. 18 is a flow diagram illustrating one embodiment of the player control process.
Figure 19:
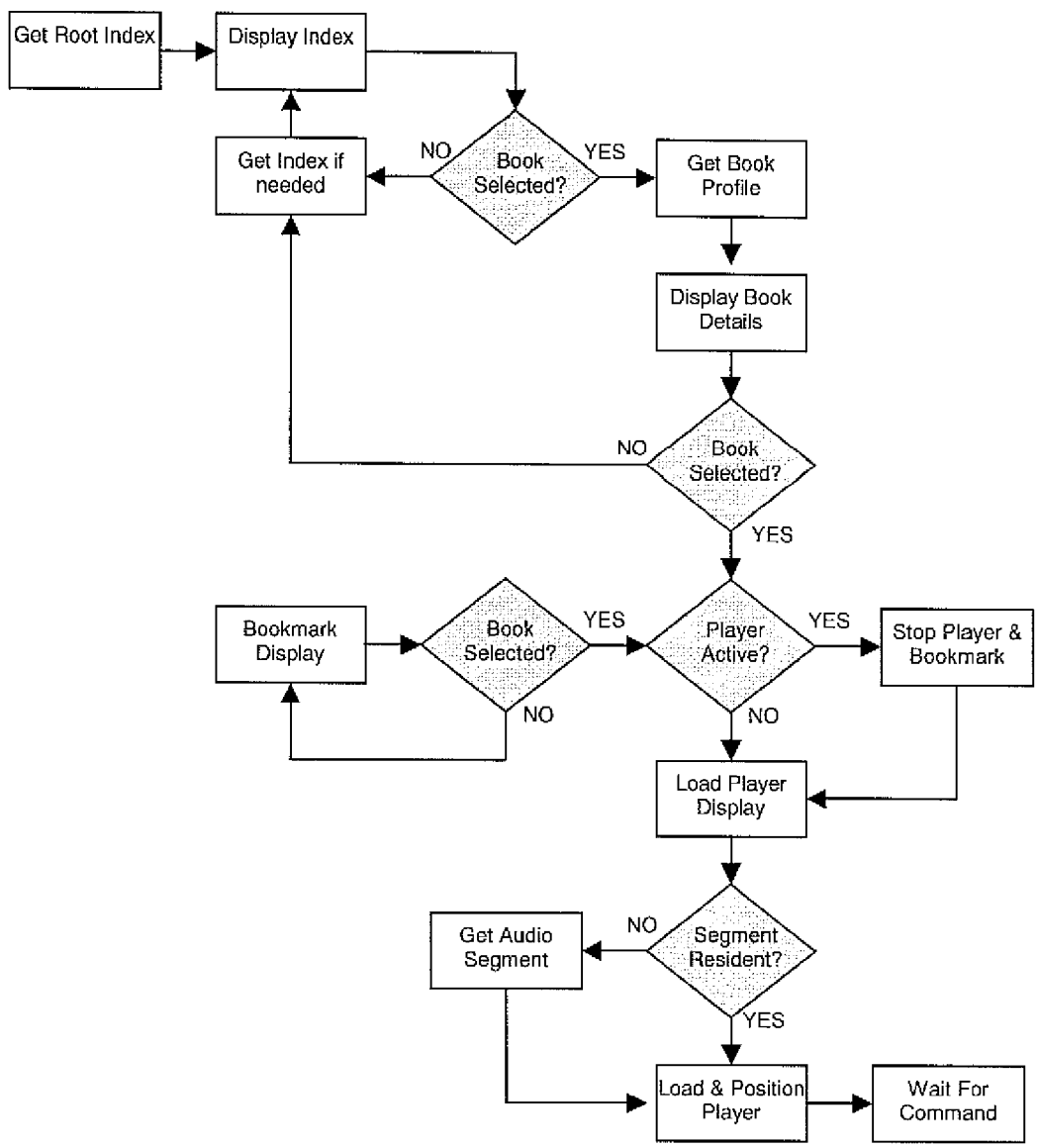
FIG. 19 is a flow diagram illustrating one embodiment of the general functional process.

Referring to FIGS. 17, 18, and 19, process flow overviews for using the software product are provided. More specifically, FIG. 17 shows an embodiment of a general process for using the software product, from start-up through various navigation steps and associated logic. A series of navigation buttons shown at the bottom of the diagram provide the user with the ability to navigate to various displays. FIG. 18 shows an embodiment of a process for using the standard control buttons. FIG. 19 shows an embodiment of a general process for loading the actual audio stream.

In summary, the software product provides the means to deliver large volume audio streams from a central library to the end user, to maintain bookmarks for each audio stream opened and being read regardless of the number of audio streams opened, to switch audio streams anywhere and anytime, to receive library based announcements and updates, to play spooled audio segments even when network service is unavailable, and to provide active management of network resources that balances load between the main library and all mirror sites on the network, and thus ensures fast, reliable service.

Advantageously, the above-described system for transmitting digital audio data uses a time-based virtual audio stream descriptor 124. More specifically, since the virtual audio stream descriptor 124 describes the plurality of small digital audio files 122 using time, the system provides efficient tracking/navigation for the user, even when the user changes files, when the user is listening to multiple audio streams, and/or when the user listens to audio streams on more than one client device (e.g., if a user is listening to the audio stream at work and wants to resume play at home). Since an audio stream is a form of media, the virtual audio stream descriptor 124 is also termed a Virtual Media Descriptor.

In accordance with another embodiment of the instant invention, a Virtual Media Descriptor is provided that includes time information for describing various digital media including digital media other than audio streams (e.g., digital media such as eText, illustrations, graphics, video, advertising), and thus is useful for providing efficient transmission, tracking, and/or navigation of various media.

Figure 20:
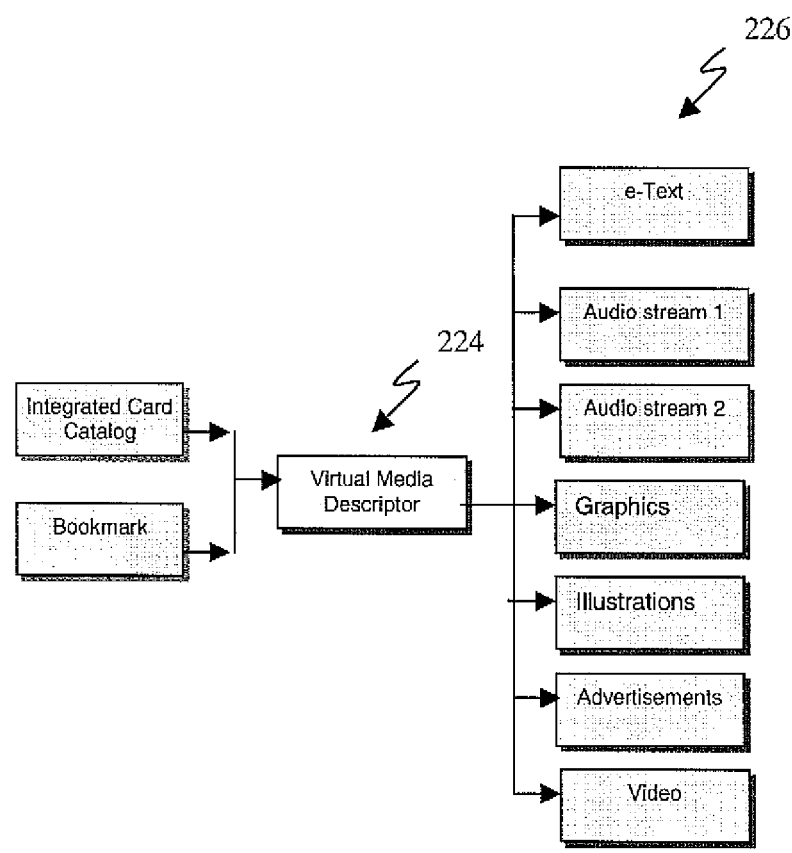
FIG. 20 is a schematic diagram illustrating how the Virtual Media Descriptor 224 links the various media streams.

Referring to FIG. 20, there is shown a schematic diagram of an embodiment of the instant invention wherein a Virtual Media Descriptor 224, which for example is accessed via a card catalogue or bookmark, is used to navigate between different media streams 226.

Figure 21:
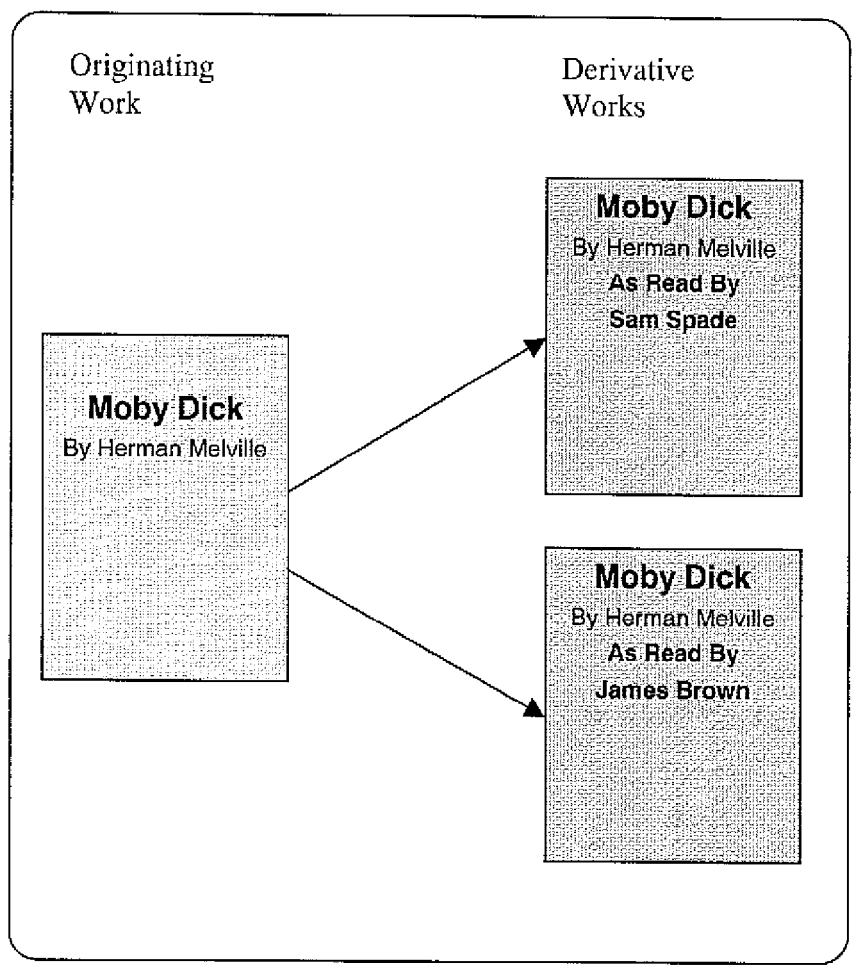
FIG. 21 is a schematic diagram illustrating how each Derivative Work is derived from the same Originating Work.

In general, the Virtual Media Descriptor 224 and the plurality of media streams 226 are derived from a specific Originating Work and/or a corresponding Derivative Work. An Originating Work is the complete text of a printed document, such as an article, speech, book, or other written work (i.e., including printed documents only printed electronically). Optionally, the Originating Work includes graphics, illustrations or other ancillary content within the printed document. For example, one example of an Originating Work is the book Moby Dick. A Derivative Work is a complete audio recording made from the corresponding Originating Work. For example, one example of a Derivate Work is an audio recording of Moby Dick read by David Jones. Referring to FIG. 21, an Originating Work may have one or more Derivative Works, but a Derivative Work will have only one Originating Work. For example, there may be multiple audio editions of a single book read by different narrators (e.g., Moby Dick as read by David Jones and Moby Dick read by Frank Smith).

The plurality of media streams 226 includes digital media corresponding to the Originating Work such as audio streams, eText, illustrations, graphics, video, figures, tables, and user generated content. Optionally, the digital media includes advertising. Each media stream will be either continuous or discontinuous. An example of a continuous media stream is an e-Book downloaded as a single file, whereas an example of a discontinuous media stream is an e-Book downloaded as a plurality of files. Another example of a discontinuous media steam is a series of independent images that represent illustrations of the e-Book, which are often separated by one or more pages in the e-Book. In general, audio streams and eText streams will be typically provided as discontinuous streams in order to reduce file size. In this case, each media stream will include a collection of media segments which, when considered as a collective cohesive group, represents a logical media experience for a user. The phrase "media segment" refers to a distinct portion of a media stream that contains content. For example, a segment may be an eText file that contains the formatted text of a chapter of a book, a file containing a graphic that represents an illustration in a book, or a file containing a sequence of audio frames that represent a word, phrase, sentence, paragraph, chapter or book or any part thereof of an audio recording. In general, the media segments will have various sizes/lengths, and may for example, be relatively short (e.g., a text file including a quotation from Winston Churchill). For example in one embodiment, one of the media streams is an actual audio stream 122 formed from a plurality of discontinuous small digital audio files, which when played successively provide the user with a continuous audio experience (i.e., when rendered, the transition between successive files is unascertainable to the user even though present).

Figure 22:
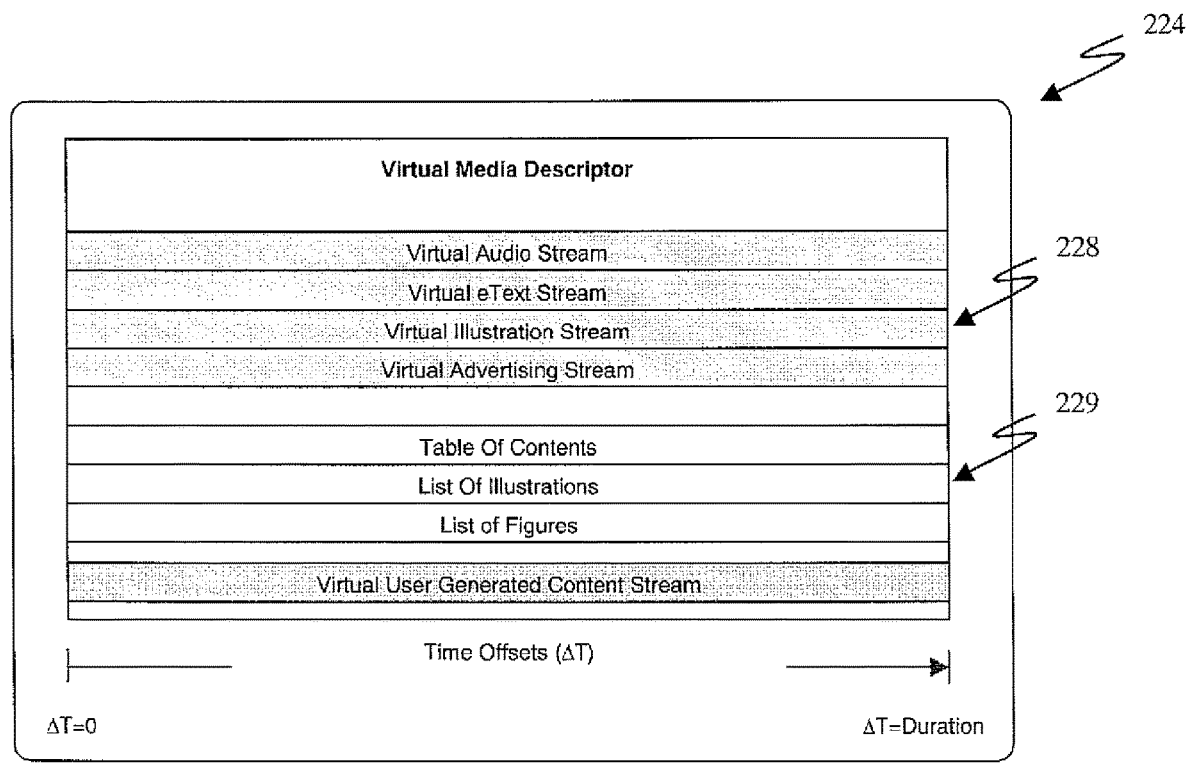
FIG. 22 is a schematic diagram illustrating the structure of one embodiment of a Virtual Media Descriptor.

The Virtual Media Descriptor 224 is an electronic file that contains information required to describe one or more of the media streams 226 in terms of time. This collection of time information is typically measured relative to a timeline of a specific Derivative Work. The Virtual Media Descriptor 224 provides the information needed to recreate a continuous media experience for the user from the discontinuous media streams in the plurality of media streams 226. In particular, the Virtual Media Descriptor 224 typically includes or references a plurality of Virtual Media Streams 228 used to navigate the corresponding media streams. For example, referring to FIG. 22, in one embodiment the Virtual Media Descriptor 224 includes a Virtual Audio Stream for navigation of an audio stream, a Virtual eText Stream for navigation of an eText stream, a Virtual Illustration stream for navigation of an illustration stream, and a Virtual Advertising stream for navigation of an advertising stream. Optionally, the Virtual Media Descriptor 224 also includes additional virtual media structures 229 used primarily, but not exclusively, to aid navigation of one of the media streams 226. For example, some examples of additional virtual media structures include, but are not limited to, Table of Contents, List of Figures, List of Illustrations, Index, etc. Further optionally, the Virtual Media Descriptor includes a Virtual User Generated Content Stream.

Each Virtual Media Stream includes a collection of time information that describes the start time, end time and/or duration of each segment in the corresponding discontinuous Media Stream, wherein the time information is defined relative to a specific Derivative Work. This time information provides the logical ordering of segments such that a rendering of the discontinuous media stream appears continuous to a user. More specifically, the Virtual Media Streams allow the experience of the corresponding continuous media stream to be recreated using the discontinuous media stream without recreating or reconstructing the original media stream. In addition, the collection of time information allows time calculations to be used to identify and access specific segments or any point therein in a random manner (i.e., access is not necessarily sequential). For example, in one embodiment of the instant invention a Virtual Media Stream and one or more predetermined time offsets are used to position or reposition a user within the corresponding media stream at will, thus allowing navigation of content that is not necessarily resident on the user device. For example, this ability to fast forward/rewind through content that is not yet delivered, and ultimately may never be, provides virtually instant access to specific media (e.g., the third word, in the fifth paragraph of chapter one hundred thirty four of Moby Dick, as either text, human read audio, or the simultaneous rendering of eText and narrated text).

Each media stream in the plurality of media streams 226 (e.g., including but not limited to eText, audio, graphics, illustrations, video, tables, and advertising), exists independent of the others as completed works. As discussed above, these completed works may be continuous or discontinuous (e.g., segmented, as for example, according to natural language gaps or chapters). No links, addresses or other references are imbedded or inserted in any media stream that make references or represents logical links to any other media stream, either in whole or in part, including to other parts of itself. For example, an audio segment contains no links or references to associated illustrations or eText, nor any reference to other segments within the audio stream. Optionally, links for the support of third party products and standards are provided within the various media streams. Such links, if present, can be useful when assembling the Virtual Media Stream, but are not required.

Advantageously, this media stream independence allows the various Virtual Media Streams to be used independently of each another. For example, a consumer may elect to enjoy only a text rendering of a book, while another consumer may choose to enjoy only an audio rendering of that same book. Options for book rendering may include, but are not limited to text book, audio book, audio picture book, text picture book, and various read along versions of rendered books where audio accompanies text or text picture books with accuracy to character level granularity. In addition, this media stream independence allows navigation through more than one Derivative Work.

Figure 23:
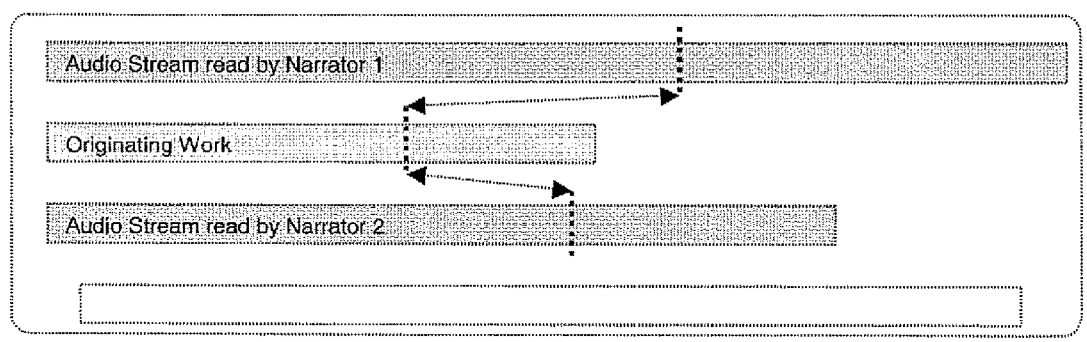
FIG. 23 is a schematic diagram illustrating how common points corresponding to a specific point in an Originating Work will have different time values in different audio recordings.

For example, while the media streams are independent from each other, common points or corresponding points do exist within each media stream. These common points provide a correlation between media streams. For example, when an Originating Work is read by multiple narrators, multiple Derivative Works (i.e., different audio recordings) are produced. Although the Derivative Works will be markedly different, there will be common points between them (i.e., such as the beginning of a chapter, paragraph or sentence). For example, referring to FIG. 23, each of the Originating Work, a first Derivative Work (i.e., audio stream read by narrator 1), and a second Derivative Work (i.e. audio stream read by narrator 2), will have a common point corresponding to the start of Chapter 10 (illustrated as dashed lines). Notably, the start of chapter 10 in the two different Derivative Works has a different time offset associated therewith.

The connection between Derivative Works, or in fact between any of the media streams corresponding to a particular Originating Work, is time. Time is generally measured as time offsets, typically relative to time zero, the logical start of a media experience. However, in some cases, a local time offset may be used for other specific purposes. Time offsets are defined in terms of the duration of a specific Derivative Work. The phrase "time offset" refers to the period of time, or difference in time, between two points in time in a Derivative Work. In general, since the first point in time serves as the reference point, it is often set as zero so that the time offset defines the period of time from the beginning of the Derivative Work and a selected point in time within the Derivative Work. Since the beginning of the Derivative Work is the point in time at which the complete audio recording is begun, the time offset represents the difference in time between the beginning point in time and the selected point in time (i.e., such that the beginning of the Derivative Work has a time offset value of zero). In other words, the time offset typically represents the time required to play the audio recording from the beginning of the Derivative Work to the selected point (i.e., if the Derivative Work is played without modification (e.g., without fast-forwarding, compression, etc)). Accordingly, the time offset also represents the duration or elapsed time for the unmodified Derivative Work to be played from the beginning to the selected point in time. In some instances, time offset may represent a difference in time between two known points of time within the Derivative Work (i.e., where neither point in time corresponds to the beginning of the Derivative Work). Since this time offset is relative to a predetermined start time, it can be thought of as a local time offset to that point. Local time offsets will have positive or negative time values. Negative time offsets allow random access to media streams corresponding to time points that precede a known start time. For example, negative time offsets can be used for, but are not limited to, rewinding through an audio stream whether the content is resident or not, flipping backwards by pages or chapters through an eText book whether content is resident or not, and automatic rendering of a media stream at a bookmarked position whether content is resident or not.

More specifically, the connection between media streams is established by creating one or more virtual representations of each logically connected media stream, where each virtual representation is determined with respect to the timeline of a specific Derivative Work. For example, some examples of these virtual representations are the Virtual Media Streams 228 contained in a Virtual Media Descriptor 224. Notably, while some of the Virtual Media Streams will be contained in the Virtual Media Descriptor 224, some Virtual Media Streams (e.g., pagination and page rendering streams) are created dynamically and are not stored. Computer software is used to establish and manage the links using logical methods of manipulating the Virtual Media Streams using time and time offsets as a common variable.

Figure 24A:
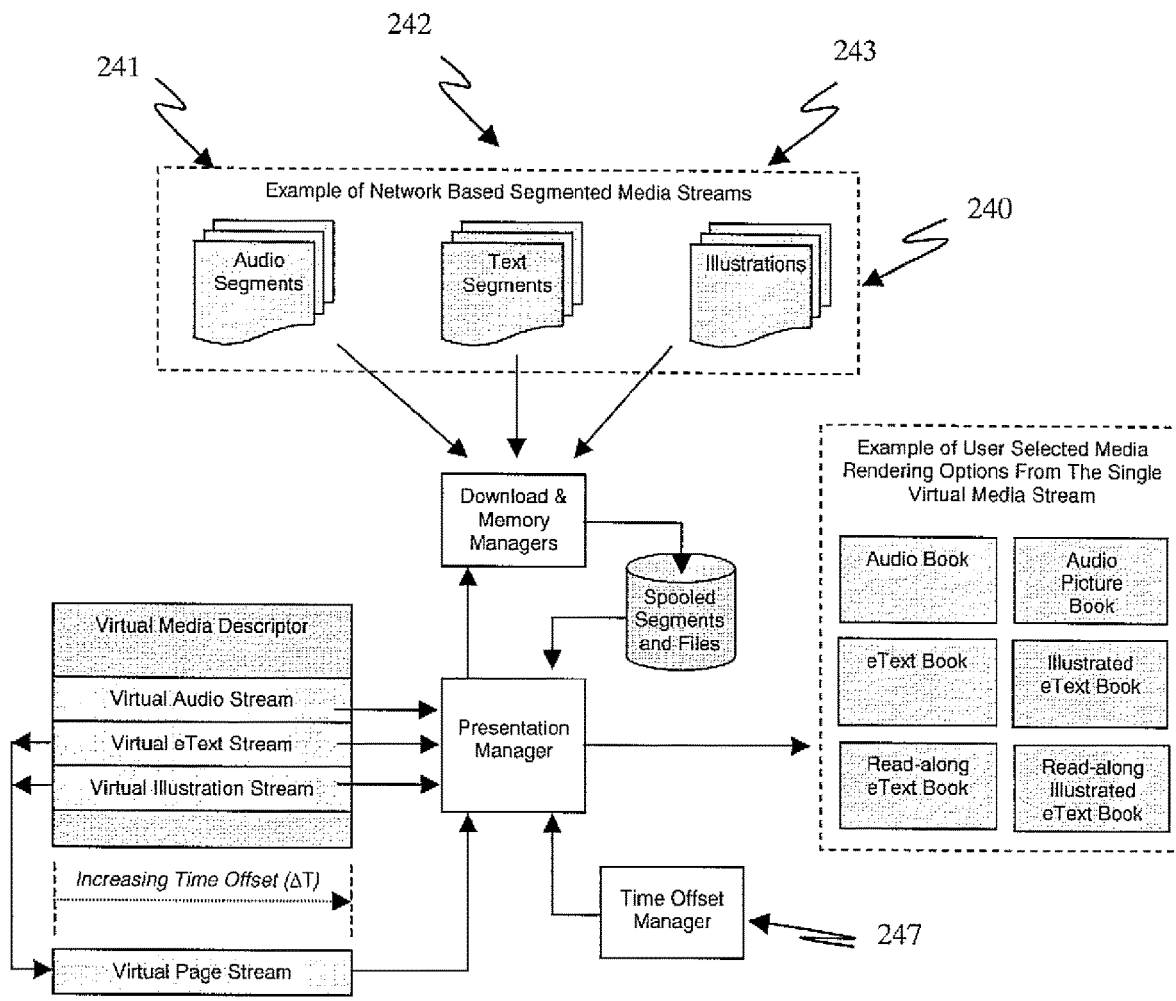
FIG. 24a is a schematic diagram illustrating a system in accordance with one embodiment of the instant invention.

Referring to FIG. 24*a*, there is shown a schematic diagram illustrating the relationship between the Virtual Media Streams and the rendered digital data. In this embodiment, the digital data files corresponding to a specific Derivative work are stored on a network accessible library 240. More specifically, the digital data includes a plurality of digital audio files 241, a plurality of digital text segment files 242, and a plurality of illustration files 243. Each of these groups of files 241, 242, 243 is a discontinuous media stream that is downloaded using the download and memory managers, one segment at a time, and rendered on a media player via a presentation manager. Navigation of the discontinuous media streams is provided via the Virtual Media Streams, which include the Virtual Audio Stream, the Virtual eText Stream, the Virtual Illustration Stream, and/or the dynamically created Virtual Page Stream. Each of these Virtual Media Streams is linked via a common timeline (i.e., the timeline of a specific Derivative Work illustrated as increasing time offset (ΔT)). Accordingly, any of the Virtual Media Streams can be used to control the rendering process via the presentation manager, so that the user having a predetermined time offset (e.g., from a bookmark, text search, table of contents, etc) can select any media rendering option available (i.e., the Originating Work can be rendered as an audio book, as an eText book, a read-along book, an audio picture book, an illustrated eText book, or a read-along illustrated eText book).

Advantageously, since each discontinuous media stream 241, 242, 243 exists independent of the others as completed works, only the segmented media required to support the selected rendering option is actually downloaded for use. More specifically, since the media streams 241, 242, 243 are discontinuous, only the segments having start and/or end times close in time to the predetermined offset need to be downloaded.

Notably, the system illustrated in FIG. 24*a* uses a Time Offset Manager 247. The Time Offset Manager 247 is a collection of oversight and control routines designed to maintain the accuracy of the current time offset and to provide the current time offset to the Presentation Manager. The Presentation Manager utilizes the current time offset to maintain the continuity of the presentation of various media streams based on the users rendering preference. Any change to the current time offset requires an event to occur. In general, these events will be timed events or discrete events. Notably, the current time offset cannot be changed without an event.

A timed event is an event that occurs at some set time. In one embodiment, the timed event occurs at regular time intervals (i.e., is repeated more than once). An example of a timed event occurring at intervals is an Audio Player Oversight Timer, which fires at some interval (e.g., 20 milliseconds) and is initiated by the operating system through the interaction of the system clock of the then current platform. In one embodiment, the timed event occurs only once. An example of a timed event that occurs only once is a 'sleep time' event. Notably, timed events normally occur only when a user has selected a rendering option that includes audio or video.

A discrete event is an event that occurs typically, but not always, through some user interaction. For example, some examples of user interactions that initiate discrete events include, but are not limited to, the user pushing a button, tapping a mouse button or touch sensitive screen, performing a drag-and-drop operation, and performing a cut & paste operation. Notably, a discrete event occurs without user interaction when the audio player reaches the end of the then current audio file.

Figure 24B:
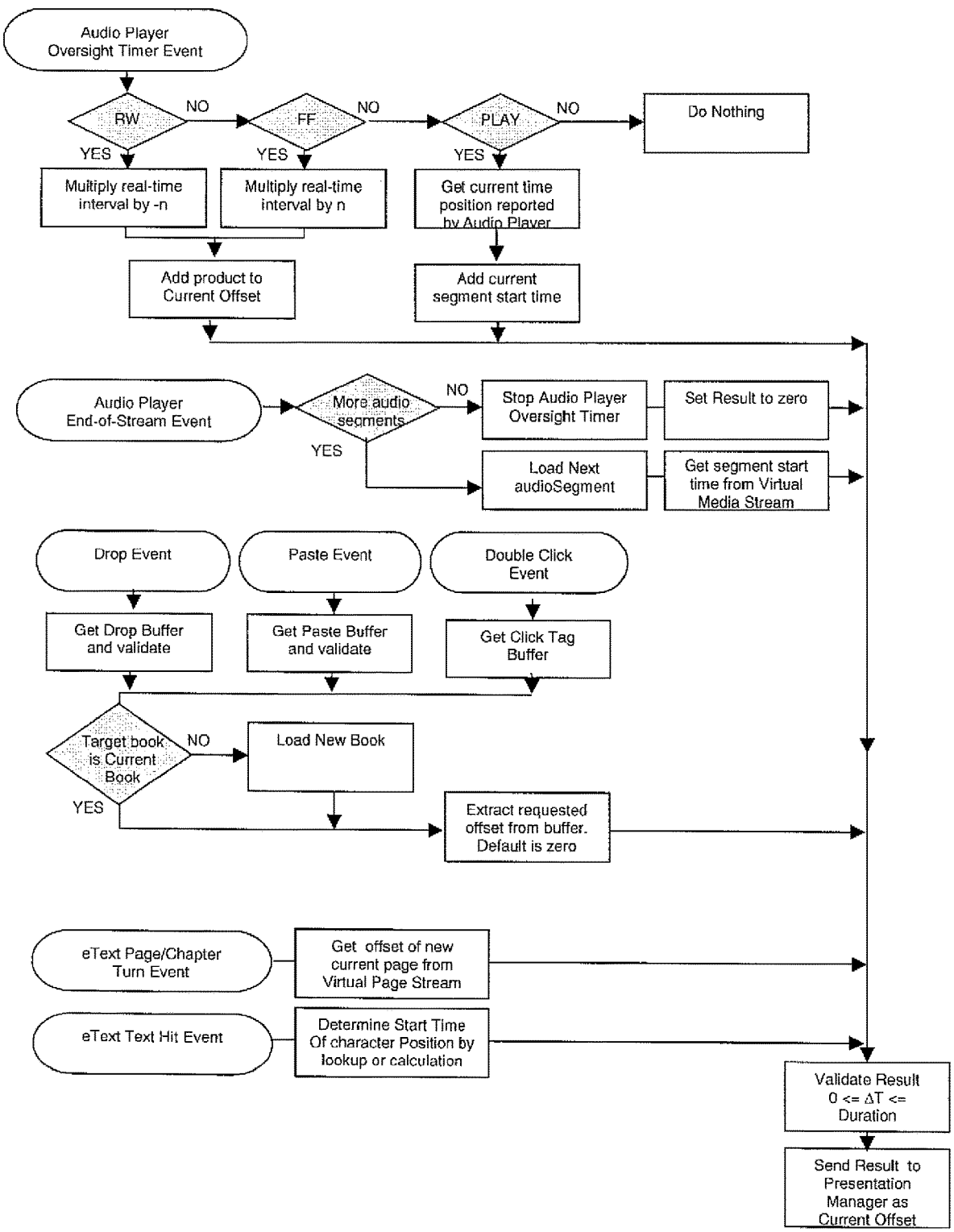
FIG. 24b is a flow diagram illustrating a process of providing a time offset using the time offset manager.

FIG. 24*b* shows one embodiment of event driven time offset management. In this embodiment, discrete events initiated by the user include pushing a rewind (RW), fast-forward (FF), or play button, end-of stream events, drop events, past events, and double click events. In addition, the discrete events include page turn events and text hit events. In one embodiment the text hit event starts the process of creating a bookmark. In another embodiment, the text hit event starts the process of creating user generated ancillary content. In all cases, an event, either timed or discrete, triggers the execution of certain programming that interacts with various time based data structures to produce a time offset (e.g., through direct lookup or calculation). This result is verified and then forwarded to the presentation manager as the new current time offset.

In one embodiment of the instant invention, this new current time offset is used to create a bookmark. For example, in one embodiment, the user identifies the desired position of the bookmark by finger tapping a touch screen or by clicking a mouse button (e.g., on a specific word or illustration). This user generated bookmark includes the then current time offset, which represents the position of the user within the discontinuous media stream(s). In general, time and time offsets within the discontinuous media streams may be thought of as a continuous timeline with its origin at a zero point, and progressing to an ultimate end point of time representing the duration of the Virtual Media Streams. However, discrete events including but not limited to drag-and-drop, stop playback, pause playback, fast forward, rewind, page turns and chapter turns may interrupt the continuity of the timeline. In addition, the user may elect to compress time or elongate time thereby affecting the timeline in real time. Time compression/elongation is generally, but not exclusively, related with audio playback. Accordingly, the current time offset provided to the presentation manager will be calculated using the software as time offsets with respect to a predetermined point in time in the timeline of the Derivative Work. In general, this predetermined point will be the beginning of the audio recording of the derivative work, however, in some embodiments it will correspond to another time such as the beginning time of a text or audio segment.

Using a continuous timeline of time to represent the logical progression through various media streams has the added advantage of allowing cross media switching in a seamless manner. For example, since the bookmark includes the time offset, which is determined relative to the common timeline used in the Virtual Media Stream, this bookmark can be used for rendering options other than the rendering option used when the bookmark was created. In fact, in one embodiment, when a user is playing a first media stream with the media player, a switch media request calculates a time offset of the current position using the time offset manager 247, which is then used to begin playing a second other media stream with the media player. In this embodiment, the software product providing the download, memory, and presentation managers also provides a number of different displays, including for example, a basic display, an introduction display, a bookmark display, a library card catalog display, a book details display, a book player display, and a book cover display. The book player display includes the standard player control buttons such as a play button, a rewind button, a fast-forward button, and the switch media button.

In fact, cross media switching is advantageously achieved whether the time offset is provided via an external media mark such as a bookmark, search result, or switch media request, or an internal media mark such as a Table of Contents, a List of Figures, a List of Illustrations, or an Index. For example, any time offset within an audio stream can be used to access a specific corresponding point in a text stream allowing a user to stop an audio recording at a specific point and start using a text rendering at that same point providing a contiguous literary experience. Such cross media switching is localized on a single platform (e.g., on a single computer) or on multiple platforms (e.g., going from text on a computer to audio on a cell phone). In each case, the literary experience for the consumer is contiguous during the cross media switching. Advantageously, cross media switching provides greater flexibility to the user. For example, in one embodiment the user switches the rendering option from a read-along eText book to an audio book, in order to conserve batteries of a portable eReader.

Notably, it is quite unconventional to talk about text and/or addressing text in terms of time. Text is, after all, a series of characters linked together in sequence. In fact, in computer circles, characters are typically addressed using byte addresses, character pointers, counters or some combination thereof to produce a specific, exact address.

In one embodiment of the instant invention, a text (e.g., an Originating Work) is read and recorded. Depending on the size and complexity of the text stream, one or more recording sessions is provided. Optionally, a process of editing the recorded audio is used to produce a finished audio stream (e.g., which in one embodiment is provided as a plurality of files corresponding to the different recording sessions). The finished audio stream (i.e., the Derivative Work), is analyzed to determine the time to playback the entire recording, that is, to determine its duration. The timeline of the finished audio stream and the text corresponding to the Originating Work are used to determine the time or time offsets for selected text points within the Originating Work. In one embodiment, time offsets for the selected text points (e.g., start of each chapter, start of each paragraph, or start of each sentence) are determined manually using a timer and subsequently entered into the Virtual eText Stream. In one embodiment, time offsets for the selected points (e.g., start of each chapter, start of each paragraph, or start of each sentence) are extrapolated using the known duration and the electronic text corresponding to the Originating Work. The extrapolated time offsets are stored in the Virtual eText Stream and/or are used when generated (e.g., as part of a dynamically created media stream or in a formatted memory structure).

The accuracy and usefulness of the extrapolation calculations is affected by many variables. Some of these variables include, but are not limited to, the actual duration of the finished audio stream, the narrator changing the pace and style of reading over time or with content, the narrator simulating other voices and styles of speech to instill in the listener an identity for various characters, the editor varying in the consistency of the editing process, the replay device (e.g., computer) varying in 'clock speed' or workload effecting the playback process, and the user electing to play the recording faster or slower than normal speed. The cumulative effect of these variables and other unknowns, introduce significant error in any calculation giving an unusable result.

Notably, in terms of measuring or calculating time or time offsets for the purposes of the instant application, a distinction should be made between the concepts of an 'error' versus a 'mistake' since these terms take on separate and distinct meanings in mathematics. A 'mistake' is a violation of the rules of mathematics that produces an incorrect result. For example, in the domain of all real numbers, $X+1=X$, is clearly a 'mistake' in that it violates the rules of addition in mathematics. In contrast, 'error' is not a "mistake". 'Error' is the difference between a measured or calculated value of a quantity and its true value. Variability is an inherent part of things being measured, of the measurement process and calculations using measured values. For example, while generally accepted value for the mathematical constant $\pi$ is 3.14, this number includes some level of 'error' (i.e., when considered to eight decimal places rather than two, $\pi=3.14159265$).

In order to successfully extrapolate useful time offsets, and to reduce as much error as possible, time offsets are typically calculated using segmented versions of the Derivative Work and/or digital data corresponding the Originating Work.

For example, in one embodiment, the Derivative Work is segmented into a plurality of small digital audio files 122 using natural language gaps as discussed with reference to FIG. 3. Subsequently, the audio stream analyzer 115 analyzes each small digital audio file to determine a collection of time information for the Virtual Stream Descriptor (i.e., the start time, end time, and/or play time of the small digital audio file relative to the timeline of the Derivate Work). Similarly, the digital content corresponding to the Originating Work is segmented into a plurality of smaller digital files (e.g., illustration files and/or electronic text files). For example, in one embodiment eText corresponding to the Originating Work is segmented and delivered to the consumer in one or more parts. The term eText, as used herein, refers to the electronic text of any written work, which may or may not be structured or formatted to an accepted standard.

When the eText is delivered in more than one part (e.g., as a plurality of smaller electronic text files), the eText is not typically reassembled into a single text file after delivered to the user, but is left segmented, thus allowing devices with limited storage resources and processing power to perform advanced memory and content management. For example, purging the first forty chapters of Moby Dick when the user has advanced significantly farther in the book, and the space is needed for other content or if space is needed for a different book. Such content may include but is not be limited to eText, audio, illustrations, advertisements, images, and video.

Figure 25:
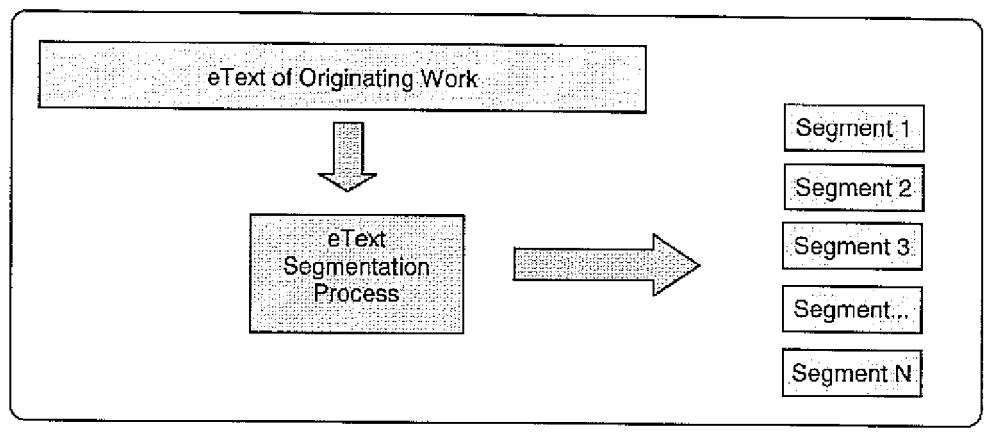
FIG. 25 is a schematic diagram illustrating the segmentation of an eText according to one embodiment of the instant invention.

Referring to FIG. 25 a schematic diagram showing the segmentation of eText corresponding to an Originating Work is shown. More specifically, the eText of an Originating Work is segmented into a plurality of eText segments (i.e., Segments 1-N). Collectively, the content of the eText segments represents the entire text of the Originating Work. Although logically dependent from one another, each segment is typically used independent of the other eText segments, thus allowing a user to start reading the content of one segment while simultaneously downloading other segments and/or other media content that is not eText (e.g., audio, images, etc.).

In one embodiment, segmentation of the eText is performed according to chapter. In other embodiments, segmentation with more or less granularity is provided. For example, in one embodiment the eText segments are further segmented into smaller units of eText as required. Such further segmentation may include, but is not limited to, chapters, paragraphs, sentences, phrases, words and pages. In general, the eText segments will be stored in a network accessible library. For example, in one embodiment the eText segments are stored in a directory in the media stream area 140 of the network accessible library illustrated in FIG. 4.

Advantageously, this segmented approach allows a user to access any point in the text of the Originating Work relatively quickly. More specifically, it allows the relevant eText segment to be delivered to a user from a network accessible library so that the user can start reading at the selected point in under 2 to 5 seconds (i.e., subject to network access and throughput), and allows the balance of the book to be delivered to the user segment by segment while the user is reading (i.e., with a process that is transparent to the user).

Figure 26:
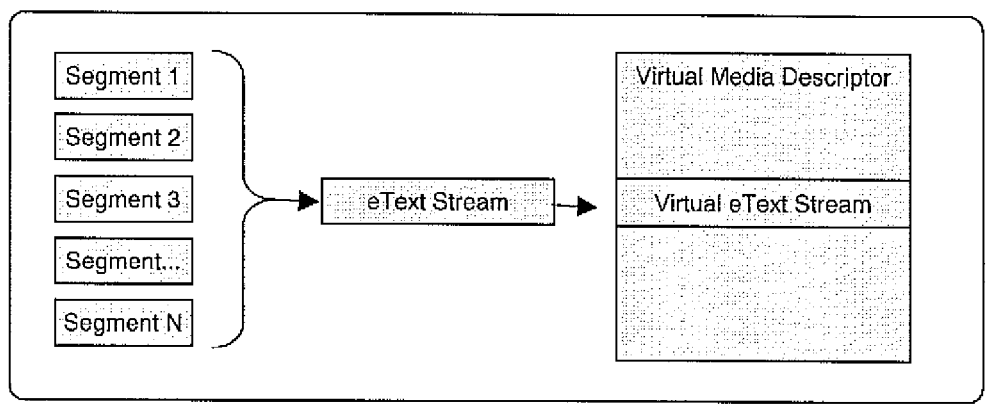
FIG. 26 is a schematic diagram showing a plurality of eText segments, which when accessed in their logical order, form a discontinuous media stream defined by the Virtual eText Stream.

Referring to FIG. 26, the eText segments collectively represent eText corresponding to the text of the Originating Work, when considered or accessed in their logical order. That is, sequential rendering of the eText segments replicates the experience of the Originating Work without reassembling the eText segments. The virtual representation of the discontinuous eText stream, is stored with the Virtual Media Descriptor.

In accordance with one embodiment of the instant invention, the virtual representation of the eText stream includes time offsets for each segment, defined relative to a corresponding Derivative Work. More specifically, a start time and/or end time of each eText segment is determined using the timeline of the Derivative Work. For example, the start time is the time offset in the Derivative Work corresponding to beginning of the text in the corresponding eText segment, whereas the end time is the time offset in the Derivative Work corresponding to the point where the text in the eText segment ends. Using the start time and the end time, or the start/end times of consecutive text files, the duration is optionally calculated. The start time, end time, and/or duration are saved and added to the definition of the Virtual eText Stream stored in the Virtual Media Descriptor.

In one embodiment, the time offsets of each of the text segments are generated manually using a timer. In one embodiment, the time offsets of each of the text segments are generated using various means, including, but not limited to, direct lookup of known values, or by calculation or extrapolation from known values. For example, when eText segmentation corresponds with known time definitions, chapters for example, the start time, end time and duration of each eText segment can be determined from known values from other Virtual Media Streams including, but not limited to, the virtual audio stream and the table of contents.

In addition, in order to minimize error in extrapolated time offsets, a set of one or more time offset tags may be established for identifiable points in the eText segments. These time tags, having been specifically determined, can be thought of as hard time tags. The time offset values of these tags are typically defined in terms of the origin of the Derivative Work, but may also be defined in terms of other identifiable points, including but not limited to, the start time of an eText segment, a chapter, paragraph, sentence, phrase, word, character, or some other convenient time.

Each time tag contains addressing information needed to locate the specific point in the eText. In one embodiment, this addressing information is an explicit position definition such as a byte or character address, byte or character count, or some other explicit means. In general, each time tag may take the form of a derivable position, such as the start of a chapter, start of a paragraph, start of a sentence, or other similar position.

The positioning of the hard time tags is dependent on the perceived correlation between the content of the electronic text and the content of the Derivative Work. Where correlation is high, the number of hard time tags needed is reduced. Where correlation is low, more hard time tags are needed. For example, when a narrator reads at a consistent rate for six paragraphs, a hard time tag at the beginning of each sentence, or each paragraph is not required. Rather, in this case, defining a hard time tag that represents the start of the first paragraph, and a hard time tag that represents the end of the sixth paragraph, would be sufficient. Notably, the end of the sixth paragraph is derivable from the start of the next paragraph, start of the next chapter, the end of the book, or some other known time offset.

In order to speed processing in implementation and use, soft time tags for identifiable points in the eText for which no hard time tag has been defined, can be extrapolated. For example, in one embodiment soft time tags are calculated for positions between positions where known time offsets are found or determined. The known time offsets include, but are not limited to, hard time tags, soft time tags, chapter start and end times. For example, in one embodiment, soft time tags are calculated for specific points, paragraphs and sentences, between the hard time tags that were defined for the first and sixth paragraphs, discussed above. Notably, the use of soft time tags is optional.

In accordance with one embodiment of the instant invention, the Virtual eText Stream, the soft time tags, and/or the hard time tags are used to render text in a specific eText segment. In particular, using the defined values of start time, end time, and/or the calculated duration in the Virtual eText Stream, an eText segment that contains a specific time offset or has a boundary time offset equal to a predetermined time offset is located and identified. More specifically, when a request for eText is made, the time offset related to the request is used to identify the eText segment required (e.g., in one embodiment the time offset is provided with a bookmark). If the eText segment is not resident on the user's device, it is downloaded from the network accessible library. The eText segment is then loaded and processed. When the eText segment is loaded, it is placed in a formatted memory structure that allows the identifiable parts of the text to be independently addressed. These are the same parts of the text used in the creation of the set of hard time tags. The hard time tags are loaded from the Virtual eText Stream contained within the Virtual Media Descriptor. Any soft time tag needed is derived from the already known time offsets. The structure that contains or addresses each identifiable part of the text has values assigned to it that represent the start time, the end time and duration of that text. For example, if a segment is loaded that contains Chapter 4 of a book, each paragraph and sentence may be independently addressable and will be associated with a start time, and end time and duration. Accordingly, the time of any word or character within each paragraph or sentence relative to the timeline of the Derivative work is readily extrapolated with minimal error (i.e., in terms of a printed document where the typical granularity is a printed word, a time calculation that contains an error equivalent to a half character or half a word is not typically relevant). Notably, increased granularity of soft and hard time offsets aids in determining the character position corresponding to the time offset.

Figure 27A:
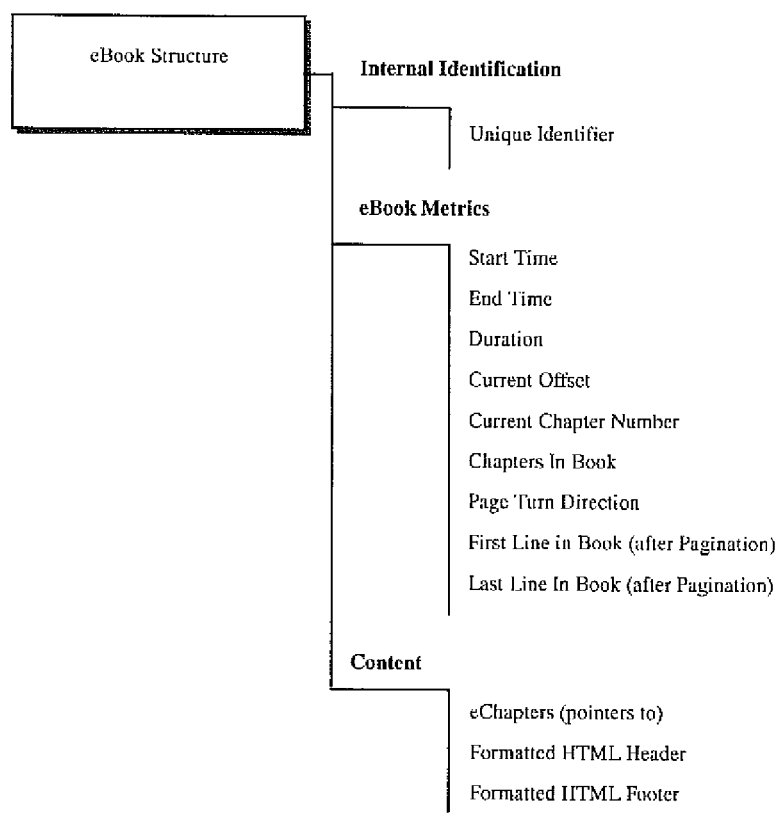
FIG. 27a shows an embodiment of an eBook structure.
Figure 27B:
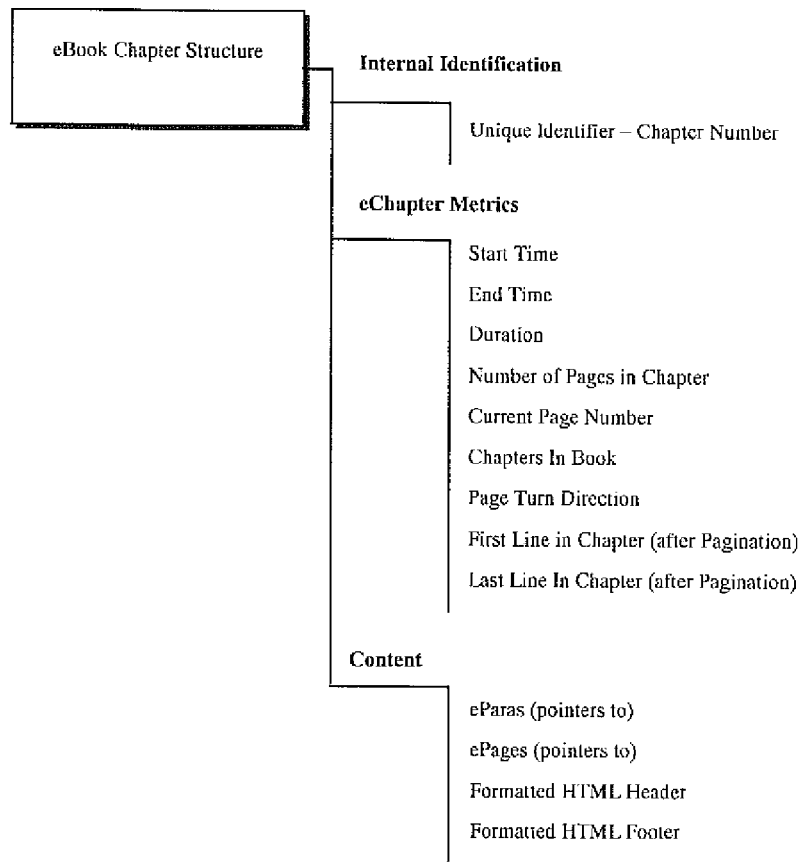
FIG. 27b shows an embodiment of an eBook chapter structure.
Figure 27C:
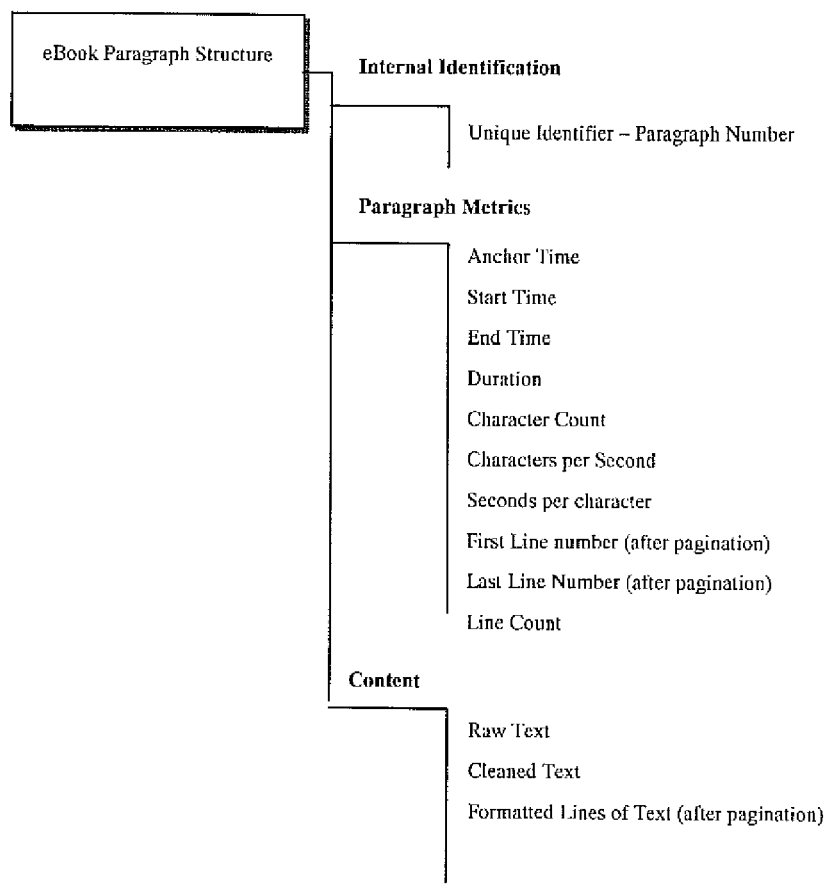
FIG. 27c shows an embodiment of an eBook paragraph structure.

FIGS. 27a-c illustrate different embodiments of formatted memory structures that allow the identifiable parts of the text to be independently addressed. These formatted memory structures, which are created in memory as needed, include an internal identification and the corresponding metrics (i.e., the numbers that represent key values and which are either measured or calculated). The content loaded into the Paragraph structure includes raw text (i.e., which is obtained directly from the eText segment file, and thus may include HTML tags and/or extra spaces between words) and/or cleaned text (i.e., which has been modified to remove HTML tags and/or excess spaces, and represents what the user sees on the screen).

Figure 28:
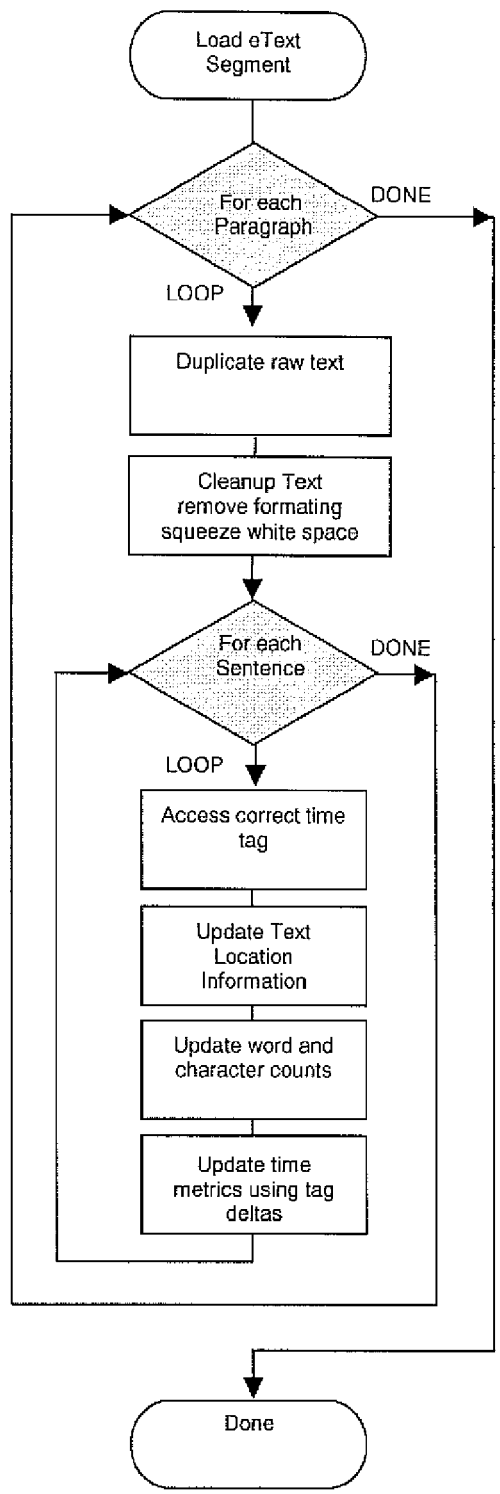
FIG. 28 is a schematic diagram showing the loading and processing of eText segments in a formatted memory structure.

FIG. 28 is a schematic diagram illustrating the loading and processing of an eText segment in accordance with one embodiment of the instant invention. Once the eText segment is loaded, the raw text for each paragraph is duplicated and cleaned up. The clean text is then further processed to update the time metrics. More specifically, the time tags associated with each sentence are analyzed to update the start times, end times, and other paragraph metrics. In this embodiment, the clean text is analyzed one sentence at a time, in other embodiments, the clean text is analyzed using smaller or larger segments of text. The processed text is addressable in memory or in context of the text stream.

Figure 29:
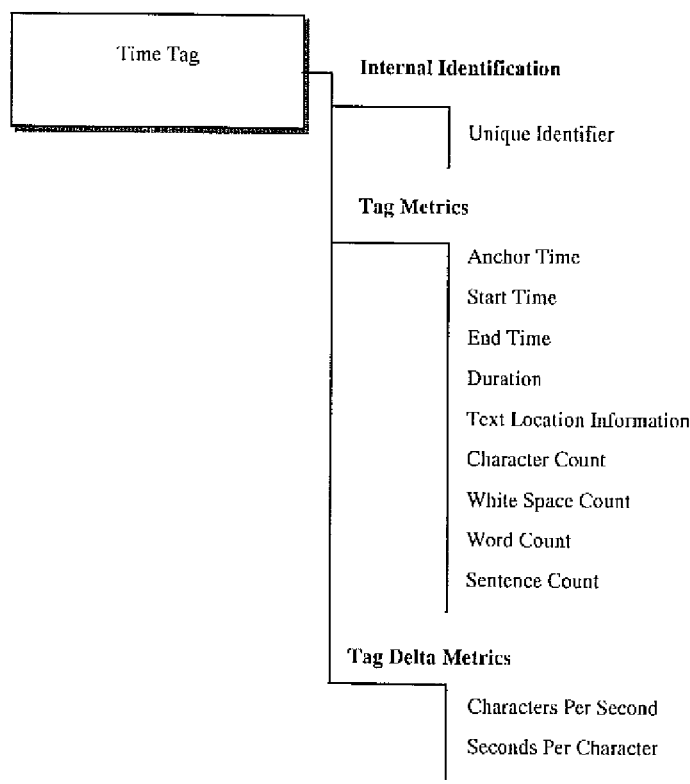
FIG. 29 shows an embodiment of a time tag.

FIG. 29 illustrates one embodiment of a time tag structure, which is used to analyze the clean text. The time tag structure includes anchor times, which do not change, and which are typically obtained from the hard time tags in the Virtual Media Descriptor or from media marks such as the Table of Contents (e.g., which is stored on the network accessible library). In contrast, the start and end times metrics will change in dependence upon various features, such as the number of characters per second. The time tag structure includes hard time tags and soft time tags.

Figure 30:
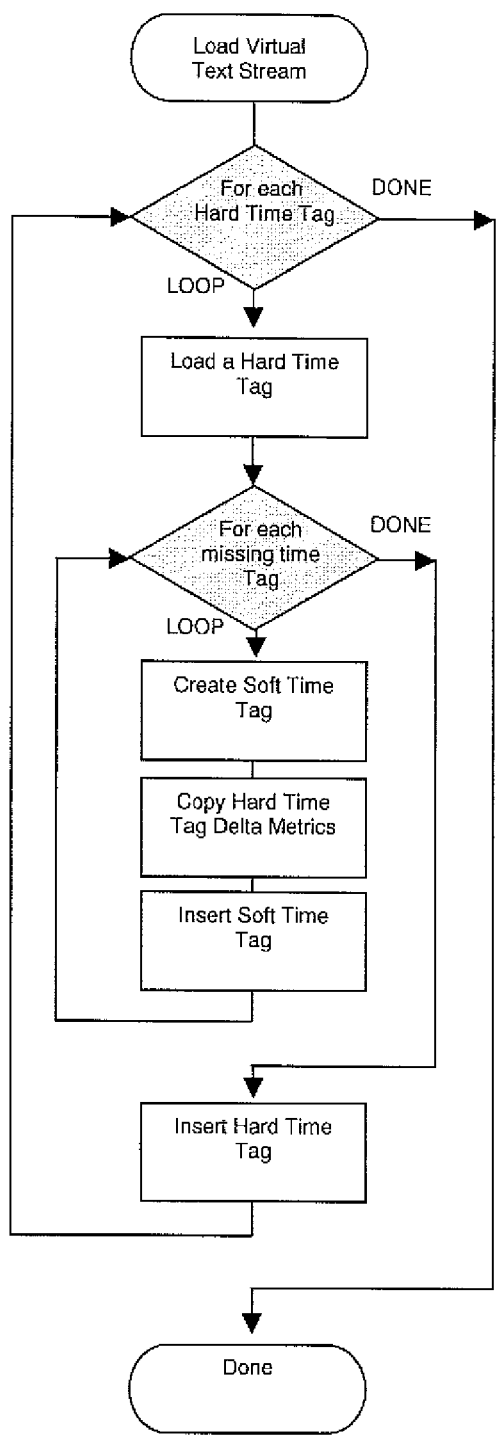
FIG. 30 is a schematic diagram illustrating the insertion of hard time tags into formatted memory structures.

FIG. 30 is a schematic diagram illustrating a process for inserting the hard time tags into the formatted memory structures (e.g., to be used to analyze each sentence of the clean text as illustrated in FIG. 28). Prior to loading the eText, the Virtual eText Stream, which includes a number of hard tags created prior to storing the Virtual Media Descriptor on the network accessible library, is loaded. Once the number of time tags corresponding to the eText loaded in the formatted memory is determined, missing time tags are calculated.

In the event that eText rendering requires external structures to satisfy a predefined baseline, the structures containing this information, cascading style sheets, for example, are downloaded prior to rendering and are treated as ancillary content. When loaded to be used for text rendering purposes, these external structures may be stored within the context of the Virtual Media Descriptor and thus will be globally available to all eText segments.

When rendering an eText segment the issue of pagination arises. It is generally accepted that printed pages contain text formatted to fit the page on which it is printed. When a consumer buys a book, the literary experience of the printed book is almost universally independent of page numbers. For example, when read aloud, a narrator does not interrupt in mid sentence to state 'page one hundred forty seven'. However, the consumer's experience of a printed book is that the content of a page never changes, and that a specific page, say page 147, is always the same. If, however, that same consumer buys a different edition of that same book, there is no guarantee that the content of each and every page will be identical to the one they already own. In fact, it is more probable that there will be variance in page content across multiple editions. For example, font size and page size differences are expected between paperback, hard cover, and/or large print books. In general, pagination makes little difference to the user except for the purposes of reference and navigation.

In general, eText or eText segments is/are rendered using a dynamic approach to pagination. Specifically, pages are defined on the basis of screen size, font size, font type, presentation style, included graphics, other ancillary content, writing style (sentence structure, paragraphs, chapters) and text availability. Accordingly, two users reading the same e-Book, one in which the eText is rendered using a 10 point font and the other using a 15 point font, will experience different pagination. Although the number of pages rendered and/or the content rendered on each page may differ between users, the different users will still have the same literary experience.

In the dynamic approach to pagination, each page is dynamically created at run time. More specifically, on any single page, the available space is filled with appropriately formatted text and ancillary content. Examples include, but are not limited to, chapter headings, paragraphs, sentences, words, illustrations, and videos. Pages are filled as long as both space and content are available. On any page there is a first word or part thereof, and a last word or part thereof. In some cases there may by only one word or part thereof on a page, so the first may also be the last. The structure of the page is not read from or written to a data file, and is not defined in advance or used from other format dependent structures. Each page exists only within the context of an instance of the execution of a software program, and is termed a Virtual Page. This dynamic approach to Page Creation means that there are no fixed pages, and that the page content is independent of the format of the Originating Work, source eText, and Derivative Work(s).

Figure 31:
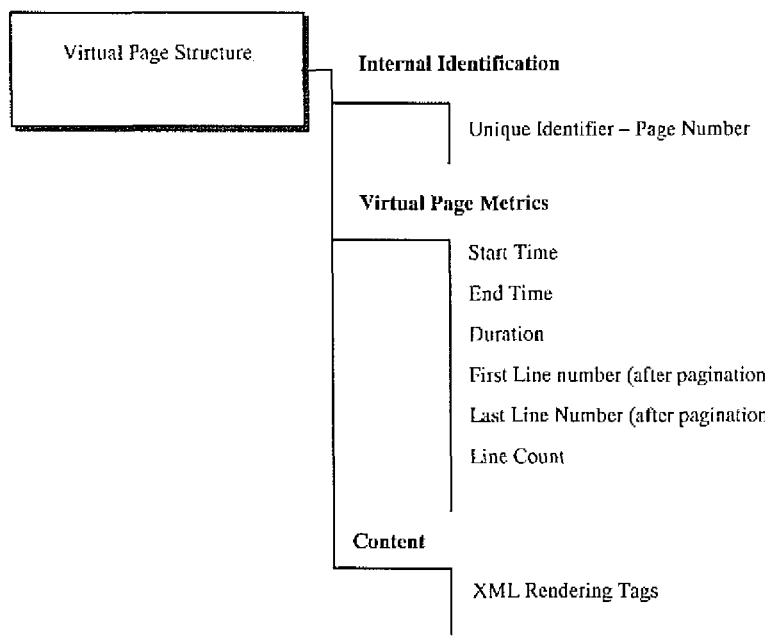
FIG. 31 shows an embodiment of a Virtual Page structure.

In accordance with one embodiment of the instant invention, each Virtual Page has a start time, and end time, and a duration. The collection of Virtual Pages assembled in order represents the Virtual Page Stream. The Virtual Page Stream is created dynamically and is not stored. The Virtual Page Stream and the Virtual Pages contained therein are used to manage and navigate content without navigating or rendering the actual content itself (i.e., the actual eText segment is not used for navigation, but rather the virtual representation is used). FIG. 31 illustrates one embodiment of formatted memory structure for the Virtual Page Stream.

Conveniently, a time offset can be calculated for each word on each Virtual Page. However, in practice, time offsets will be calculated for only specific words/points. For example, in one embodiment, time offsets are only calculated for the first and last words on each page. The start time of the first word on the page defines the start time of the rendered page. The start time of the last word plus the duration of the last word defines the end time of the page. Given a known start time, and a known end time, the duration of the page is calculated. In other embodiments, time offsets are also calculated for one or more independently identifiable parts of the text including, but not limited to, paragraphs or sentences. Each of these will have a start time, an end time and duration. In each case, each word and character on the page can be identified in terms of a time offset and can have an individual start time, end time and duration extrapolated therefor. In yet another embodiment, the start time and/or end time of each and every line of rendered text is determined. Advantageously, providing time offsets for each line of rendered text reduces error and facilates user interaction. In particular, extrapolating time offsets for each line provides a relatively accurate synchronization between text and audio. In some embodiments, pages will only contain ancillary content including, but not limited to illustrations and graphics. In these cases, the start time will be the start time of the first ancillary content and the end time will the end time associated with the last ancillary content. If there is only one piece of ancillary content on the page, the start time and end time will be that associated with that one piece of ancillary content. The start times and end times are measured relative to the beginning of the timeline of the predetermined Derivative Work. In general, the start time and end time on each Virtual Page will be affected by the presentation preferences of the user. For example, consider the case of different font sizes. The content of a page with a small font will be greater than the content on a page with a large font. As a result, when the page is created, the start time, end time and duration of the pages will be partially dependent on font size. In addition, the start time, end time and duration will be impacted by the presence of ancillary content (e.g., illustrations, video, figures, tables). This content is rendered with the relevant text based on the start time, end time, and duration associated with the ancillary content. Such content will displace some space within the rendered page, thereby reducing the amount of space available for text.

Given that each Virtual Page has a start time, an end time, and a duration associated with it, it is possible to navigate through the pages of an eBook using time and time offset. When a time offset representing a request to render eText is provided, that time offset is compared with the start time and end time of each Virtual Page until the page containing that time offset is found. Utilizing other virtual streams within the Virtual Media Descriptor that contain known time offsets, including but not limited to the Table of Contents, the search for a page containing a desired offset can be optimized, providing access at greater speeds and with greater efficiency.

Given that a time offset can be calculated for each word on each Virtual Page, it is possible to provide perfect synchronization when rendering both the Virtual Page Stream and the audio stream (i.e., which in one embodiment is rendered by playing a plurality of discontinuous audio files), thus producing a read-along effect. For example, when rendered graphically for a user, page content is accessed from memory and displayed for the user. Each rendered element will have a start time an end time and a duration associated with it. As a result, it is possible to highlight individual elements including but not limited to words, phrases, lines, sentences, paragraphs or illustrations in perfect synchronization with the time line of the Derivative Work.

In accordance with one embodiment of the instant invention, the time offsets calculated for specific text positions in the Virtual Page Stream are used to bookmark the user's place in an eBook. For example, since a text position within an Originating Work can be expressed in terms of the timeline of a Derivative Work, and since a time offset of a particular point in a Virtual Page Stream can be expressed in terms of the same timeline, a bookmark for a specific point in the Virtual Page corresponding the text position in the Originating text is easily provided. In general, the text position will be a character position, or the start of a word, phrase, sentence, paragraph, section, or chapter. In some cases, the text position will be a punctuation mark or a white space such a space character or tab characters.

In general, the bookmark will include an identifier of the Derivative Work and a time offset of the bookmarked position (e.g., the specific text position). Since each Derivative Work has only one Originating Work, identification of the Originating Work and access to the eText thereof is provided. Using the time offset from the bookmark, and the time offset information contained in one or more Virtual Media Streams, the bookmarked text position can be used to locate the bookmarked position within the Originating Work. In general, the bookmarked text position will be determined by lookup, calculation or extrapolation.

Optionally, to assist the user of the media stream in 'picking up where you left off', a predetermined time (e.g., 30 seconds) is subtracted from the time offset of the bookmarked position and stored as the new time offset. In other words, the bookmark contains two time offsets. The absolute time offset is used to position the eText, and the modified time offset is used to position the audio stream. In general, the bookmark also contains a user readable text tag.

In one embodiment, a bookmark is created from a Virtual Page using an implied position. In this embodiment, the bookmark position is assumed to be the start of the first word in the first line of the text rendered on the page. The time offset for that word is calculated and that time is used in the creation of the bookmark. In the event that ancillary content appears on the rendered page before any text appears, then the start time of the ancillary content is used.

In one embodiment, a bookmark is created from a Virtual Page using an explicit position. In this embodiment, the bookmark position is specified by the user by specifically identifying a text position on the rendered page. This is accomplished by, for example, positioning a cursor on or near the selected text (e.g., using mouse pointer on a computer or device so equipped, or by manually touching a screen where touch sensitive technology is in use or by some other means of pointing). After the user has identified the desired position of the bookmark, some interaction occurs to indicate that a bookmark should be created for the desired position (e.g., a double finger tap or mouse click). The time offset of the desired position is calculated and that time offset is used to create a bookmark.

In one embodiment, the bookmark is used to reposition the eText stream and the Virtual Page Stream to the appropriate rendered page using the time offset therein to identify the specific page that contains the bookmarked position. Note that the time offset of a bookmark is independent of pagination and the bookmarked position may appear on different rendered pages for different users subject to the conditions of pagination (e.g., font size or page size).

Advantageously, bookmarking text using a point in time relative to a start of the beginning of an audio recording (e.g., using a time offset) allows the user to conveniently switch between modes of interacting with the media stream. Accordingly, a user having purchased a media stream that is considered both an e-book and an audio-book, can alternate between reading the e-Book and listening to the audio stream using the time based bookmark, as convenient. For example, a user having read the e-Book up to a selected point could then bookmark the text at the selected point (e.g., an implied or explicit position). Since the bookmark is time based (i.e., the bookmarked position is determined using a time value rather than using a position or location), the bookmark can then be used to start listening to the audio of the e-book from the bookmarked position (i.e., begin play of a continuous or discontinuous audio stream corresponding to the Derivative Work at the time corresponding to the time offset in the bookmark).

Further advantageously, in addition to providing the ability to switch between media streams, bookmarks containing a time offset can be used to access any media stream at will, providing virtually instant access to specific media. More specifically, the time offset associated with the bookmark is used with the Virtual Media Descriptor to position the media stream to the selected position. This use of a bookmarked position is independent of the process used to generate it.

For example, in one embodiment of the instant invention a time-based bookmark created from an audio rendering of a work is used to position a text rendering of the same work. In another embodiment, a bookmark including a time offset created from a Virtual Page of an eText is used to begin rendering a corresponding audio stream at the bookmarked position. In both cases, the positions of either text or audio correspond directly to one another (i.e., with respect to time). In yet another embodiment, a bookmark including a time offset is used to translate the bookmarked position from one Derivative Work to another Derivative Work, where both Derivative Works are created from the same Originating Work.

Figure 32:
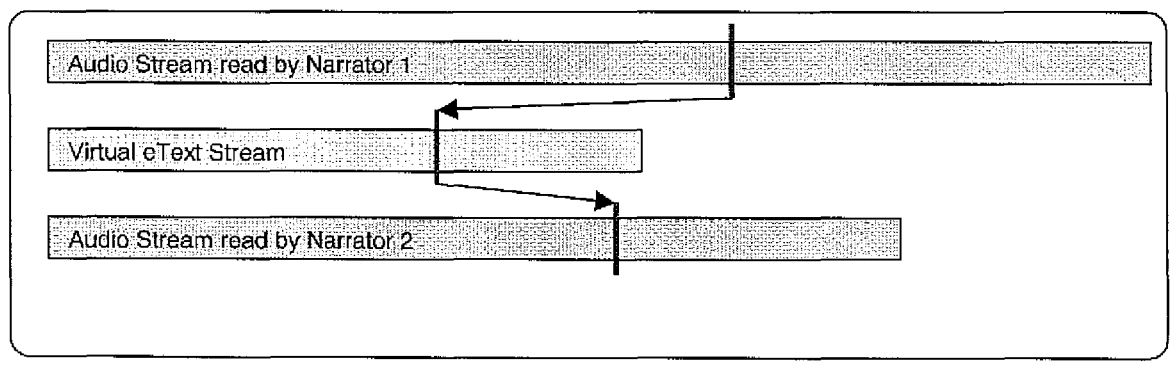
FIG. 32 is a schematic diagram illustrating the correlation between an eText Stream and two Derivative Works.

FIG. 32 illustrates an embodiment wherein a bookmarked position (i.e., illustrated with a vertical line and corresponding to a predetermined point such as the start of Chapter 10) is translated between different Derivative Works. In this embodiment, a bookmark is created using a time offset relative to a First Derivative work (i.e., corresponding to the audio stream read by Narrator 1). The time offset in the bookmark is used to identify the specific text position using the information contained in the Virtual eText stream within the Virtual Media Descriptor of the first Derivative Work. This position is then used to identify the time offset of the text position in the Virtual eText stream contained within a second Virtual Media Descriptor. This process allows two people, each using the same book but read by different narrators to exchange bookmarks and preserve the correlation between points within their mutual literary experience. Note that only the virtual representation of all media streams is needed to translate the time offset from one audio stream to the time offset of another. No actual content is required.

In another embodiment of the instant invention a bookmark including a time offset created from either an audio rendering of a work or a text rendering of the same work is used to access other media streams including media such as Illustrations, Figures and Advertising, and User Generated Content. Since the bookmarks containing time offset data provide access to, or allow switching between, different media streams, they are also termed Cross Media Bookmarks.

In yet another embodiment of the instant invention, a virtual media structure including a time offset (e.g., from either an audio rendering of a work or a text rendering of the same work) is used to switch between audio and eText media streams, to access any media stream at will, to translate bookmarked position between different Derivative Works, and/or to access media streams including media such as Illustrations, Figures and Advertising, and User Generated Content. Some examples of virtual media structures having a time offset include, but are not limited to, Table of Contents, List of Figures, List of Illustrations, Index, internal media marks, illustrations related to the audio stream, and/or internal advertising.

In each of the above-described embodiments, the time or time offset in the bookmark/virtual media structure is used to manage the transmission and/or rendering of digital content. Advantageously, the use of time or time offsets provides the common thread between the different media types, thus allowing the user to switch easily between the different media streams (e.g., regardless of the format of the media streams and/or whether they are resident on the user's media player). In addition, since the use of time or time offsets provides a common thread between the different media types, the use of time or time offsets allows the different media streams to be rendered in a substantially synchronous manner. Advantageously, the synchronous rendering of the media streams is provided without modifying the media streams with identifiers, but rather is achieved using a separate file (i.e., the Virtual Media Descriptor). Furthermore, the use of time and/or time offsets allows the synergetic convergence of both continuous and discontinuous media streams (e.g., where the media includes, but is not limited to, eText, human read audio, illustrations, graphics, video, and advertising). Advantageously, this synergetic convergence of both continuous and discontinuous media streams allows the user to have virtually instant access to any point in the selected media stream(s) regardless of the size of the media stream(s). The synergetic convergence of both continuous and discontinuous media streams is also achieved using the Virtual Media Descriptor.

Referring again to FIG. 22, the Virtual Media Descriptor includes a Virtual Audio Stream and a Virtual eText Stream, and optionally includes Virtual Media Streams that represent things such as Illustrations and Advertising. Each of these Virtual Media Streams will include time offset information contained within it that is used to manage and render the relevant content. This time offset information is derived relative to the information contained within the Virtual Audio Stream of the Virtual Media Descriptor. As a result, the timing information is used to insert or display relevant content based on the timing information associated with the then currently rendered page.

The Virtual Media Descriptor also optionally includes a Virtual User Generated Content Stream. As is common in the eText industry, a user may optionally create ancillary content within the context of an eText book. This ancillary content may include, but is not limited to, electronic versions of Post-It notes, margin notes, highlighting, graphics, videos, and links to web addresses or web based content. In accordance with one embodiment of the instant invention, User Generated Ancillary content is linked to the eText using time offsets, where the time offsets are relative to a selected Derivative Work. The time offsets for User Generated Ancillary content is determined by various methods including, but not limited to, direct look up of a known time offset, or determined by calculation or extrapolation from convenient known time offsets. For example, an electronic Post-it Note may be affixed to a specific sentence using the start time of the first word in that sentence. Advantageously, utilizing a time offset in this way allows a user to be presented with a visual representation of the User Generated Ancillary Content when utilizing only an audio version of a media stream. In addition, the user may change pagination for various reasons including, but not limited to, font selection, changes in page size forced by platform limitations or other reasons. The User Generated Ancillary Content will always appear in appropriate context relative to the content and the manner of presentation including, but not limited to, eText, audio, or human read audio. In addition, the User Generated Ancillary Content may be transmitted electronically using industry standard methods including, but not limited to email, ftp, html or other electronic means. The User Generated Ancillary Content need not be accompanied by any content or other information bearing structures. On receipt, the receiving user need only access the User Generated Ancillary Content. The Originating Work and or a Derivative or both are immediately accessed and correctly positioned based on the time and media stream information contained within the User Generated Ancillary Content. If the user has set preferences that govern Derivative Work selection, the time offset information for the User Generated Ancillary Content is translated from one Derivative Work to another.

In accordance with an embodiment of the instant invention, the time or time offset information in the Virtual Media Descriptor is used to navigate within the different media streams. For example, in one embodiment the time or time offset information is used in text navigation, whereas in other embodiments the time or time offset information is used to navigate an audio stream.

With regards to the navigation of eText, recall that each character position within an eText stream has a start time, an end time, and a duration relative to a specific Derivative Work. Accordingly, time and/or time offsets can be used to navigate to a specific character position within the eText corresponding to the Originating Work.

For example, in one embodiment a desired time or time offset is predetermined by a bookmark, and this time offset is then compared to the time information in the Virtual Media Descriptor to identify the character position that has a start time less than or equal to the predetermined time offset and an end time greater than the predetermined time offset. More specifically, the predetermined time offsets are compared to the known time offsets in the Virtual Audio Stream and the hard time tags in the Virtual eText Stream to find the desired character position. Once the character position is identified, the text stream is then positioned to the identified character position. Accordingly, it is possible to navigate through an eText stream to a desired character position even when the eText corresponding to the Originating Work and/or the audio stream corresponding to the Derivative Work are not resident the target platform. In other words, it is possible for a user to accurately navigate through content that the user has not yet downloaded or otherwise have access to. In addition, it is possible to navigate through an entire eText stream to a desired character position even when the eText stream is provided as a plurality of discontinuous eText files.

In the above-described embodiment, the predetermined offsets are compared to the known time offsets in the Virtual Audio Stream and the hard time tags in the Virtual eText Stream. Optionally, the desired character position is identified using a direct lookup of known times and character positions, a direct lookup of known times and implied character positions, or by calculation or extrapolation using a combination of the start time or the end time, and the duration, and any of many common search algorithms. Determining the time offset for each character position in the eText using methods such as direct lookup, implied position, inferred position, calculated position, estimated position, extrapolated position, or any combination thereof, advantageously reduces the time needed to identify the desired character position with respect to the desired time offset. In each case, when navigating eText, recall that the time offsets are defined relative to a predetermined Derivative Work. Accordingly, the start time and end time and/or duration of each text position will typically change relative to the Derivative Work selected.

With regards to the navigation of Audio Streams, recall that each audio stream is typically provided as a continuous or discontinuous audio stream. For example in one embodiment, the audio stream is a plurality of audio segments, wherein each audio segment is a small digital audio file created by segmenting a continuous audio stream (i.e., Derivative Work) in dependence upon located natural language gaps, wherein the natural language gaps include areas of silence or low decibel levels corresponding to spaces between words in the same paragraph in the corresponding Originating Work. Each audio segment has a start time, an end time, and/or a duration relative to the corresponding specific Derivative Work, which is stored in the Virtual Media Stream. Accordingly, the time and/or time offsets provided by an internal media mark such as a table of contents or an external media mark such as a bookmark, can be used to navigate to a specific position in the audio stream. Advantageously, since the internal and/or external media marks are time-based and share a common timeline, the media in which the time or time offsets are used is not limited (i.e., as long as they can be connected via the Virtual Media Descriptor). For example, a bookmark created during the rendering of eText is useful for navigating to the corresponding point (i.e., book marked point) in the corresponding audio stream.

In addition to allowing a user to navigate to specific predetermined points in different media streams using cross media bookmarks, the common timeline also provides the user with the ability to navigate each media stream using data associated with a different media stream. For example, the common timeline enables the user to perform a text search of an audio stream, and/or enables the user to reposition an audio stream using text.

In accordance with one embodiment of the instant invention, the common time line between eText streams and Audio Streams is used to provide a text search of the audio stream. As discussed previously, it is possible to determine a time offset for each character position in an eText or eText segment. The time offset for each character is determined using various methods including, but not limited to, direct lookup, implied position, inferred position, calculated position, estimated position, extrapolated position, or any combination thereof. It is therefore possible to determine a time offset in an audio stream for each character in the eText.

Using commonly accepted text searching techniques, it is possible to locate one or more occurrences of a search object within the eText. Such search objects include, but are not limited to characters, words, phrases, sentences, paragraphs, titles, headings, symbols, tables, graphics, quotations or references. Each occurrence of the located search object within the eText will have a time offset associated with it defined within the context of the search object. For example, a search object that is a text string may return one or more occurrence of that search object, where each occurrence will have a time offset related to the start time of the first character in the located string. Alternatively, a search object that is a graphic object may return one or more occurrence of that object, where each such occurrence will have a time offset related to the start time of each occurrence of that graphic. Such search of the entire eText of a book and assembling the results is typically completed in the sub-second range.

In one embodiment, located occurrences of a search object are assembled into a convenient results structure used to assemble and display information to a user. Some examples of convenient results structures include, but are not limited to, a list, a table, a dropdown box, a pop-out dialog box, and pop-up dialog box. Each result will have a start time, an end time, and a duration associated with it. When selected by a user, the start time of the selected result is used to either reposition the audio stream to the time offset of the selected result, and/or reposition the eText to the selected character position associated with that time offset.

Optionally, the time offset for each located occurrence of a search object is subject to additional processing or calculation to produce a more meaningful result. For example, consider the book Moby Dick. In searching the eBook Moby Dick using the text search object 'Ahab', over 500 occurrences of that search object will be found. For many users, a list having over 500 occurrences will be too large to be useful (e.g., may be considered an unusable result). In these instances, it is advantageous to expand each result to provide a context for each occurrence. Such expansion for each result may include, but is not limited to, including several words that appear before and several words that appear after the located occurrence of the search term, using the sentence that includes the search object, and/or calculating a new start time and new end time for the result by subtracting and adding an arbitrary time offset from the start time and end time of a specific result and display all words that fall within the newly calculated start and end times.

In general, the time offset references are generated using the correlated Virtual Media Stream information for both the Originating Work and the Derivative Work (e.g., in the Virtual Media Descriptor). When a result is selected, the selected Media Stream is positioned to the time offset of the selected result relative to some known time offset. For example, in one embodiment the Media Stream is positioned to the time offset of the selected result, where the time offset is with respect to the start of the media stream. In another embodiment, the Media Stream is positioned to the time offset of the selected result, where the time offset is with respect to the some other convenient known, calculated, or extrapolated time offset. Advantageously, the audio stream does need not be contiguous and/or resident on the users platform in order to be referenced (e.g., in one embodiment the audio stream is a stored as a plurality of discontinuous audio files in a network based library). When the audio segment is not resident on the users platform it is obtained from the network based library (e.g. designed to typically be transmitted in under two seconds). Any ancillary content needed in support of the reference including, but not limited, to graphics, videos, or any other ancillary content is similarly obtained. When the required content is resident on the users platform, access to the selected result is typically in the sub-second range.

Accordingly, it is possible to perform a text search of an audio stream, and using the returned results, access a specific desired point in that audio stream with virtually instant access. For example, consider the case of Moby Dick, an audio stream that plays for more than 24 hours and, subject to internal format and desired audio quality, may exceed one gigabyte in size. Without any prior audio download or access or use of the audio stream, it is possible to do a text search for the famous quotation "from hell's heart I stab at thee', and have the resulting reference returned in less than one second. Selecting the reference to that quotation positions the audio stream to that point so that the user is listening to the audio stream at the position of the quotation in under two seconds. No prior download or knowledge of the structure of the book is required. Access to a specific audio quotation in a 24 hour human read audio stream is virtually instantaneous.

In general, when the eText corresponding to the audio stream to be searched is resident on the users platform, it is used for searching purposes. However, the user does not need to have the eText open to perform the search. In the event that the eText is either incomplete or not otherwise available, a search request is forwarded to the network based library. The content is searched for the requested search object and a results list is returned. The result is that the user can perform a search for a search object on eText and audio that is not resident on the users platform, and still utilize the returned result in the two second design time.

Notably, the time offset references within the results listed for a specific search are determined relative to a specific Derivative Work. As discussed previously, an Originating Work may have more than one Derivative Work, and different Derivative works will likely correspond to different time offsets. Therefore, a search for a specific search object will in all probability return differing time offsets for the same search object for each different Derivative Work. As with Cross Media Bookmarks with respect to multiple narrators, search results from one Derivative Work can be used to access a different Derivative Work when both Virtual Media Descriptors are available.

Advantageously, search results may be thought of in terms of External Media Marks (e.g., an External Bookmark), which are external from the Virtual Media Descriptor and which contain time or time offsets. Accordingly, the search results are transferable between users, and can be sent electronically, by email for example, to various recipients, to be used by the recipients for accessing the reference point. For example, in one embodiment the search results for a text string corresponding to a specific quote is sent to a second user, who uses the search results to listen to an audio rendering of the quote. In fact, in one embodiment of the instant invention, the software used to render the digital content and to create the bookmark and/or search result provides the bookmarks and/or search results as independent electronic files that are transferable between users. For example, in one embodiment, the software program offers a drag and drop function whereby one of a bookmark and a shortcut to the bookmark is electronically transferred to a desktop, to another window (e.g., a file manager), or a different application (e.g., posted to a social networking site or copied into an e-mail program as an attachment).

In accordance with another embodiment of the instant invention, the common time line between eText streams and Audio Streams is used to reposition an Audio Stream using text and time. As described previously, a text position within an Originating Work (e.g., the text stream) is readily expressed in terms of time relative to a specific Derivative Work (i.e., the audio stream), where every character position has a start time, and end time, and a duration. When a character position within an Originating Work is selected, the start time of the selected character position is therefore known. Using this then known start time, the Derivative Work is positioned to the point that corresponds to that start time. For example, in embodiment a user selects a character position that corresponds to the middle of the $3^{rd}$ word of the $7^{th}$ paragraph of the $135^{th}$ chapter of Moby Dick, and as a result of that selection, the audio stream is positioned to the corresponding point in the audio stream such that playback begins at that specific point.

Advantageously, defining Audio Streams and Text streams in terms of time and/or time offsets relative to a specific audio stream timeline provides a system and method for the efficient navigation of digital data (e.g., such as eBooks and/or Audiobooks). More specifically, it provides the synergetic convergence of both continuous media streams (e.g., the text corresponding to the Originating Work) and discontinuous media streams (e.g., an audio stream corresponding to the Derivative Work stored as a plurality of relatively small digital audio files) using time, and provides virtually instant access to any point in the convergent media streams regardless of the size of the resulting convergent media streams. The media including, but not limited to, EText, human read audio, illustrations, graphics, video, and advertising. The convergence uses the Virtual Media Descriptor, which describes each media stream in terms of time. Time information used to describe all media streams within a specific Virtual Media Descriptor, are relative to a specific recorded audio recording (a Derivative Work) of a specific originating text (an Originating Work).

Further advantageously, the synergetic convergence of both continuous and discontinuous media streams provides users with virtually instant on-demand access to any part of any media stream from anywhere network facilities exist on or off the planet, commonly referred to as 'Cloud Based Content'.

Further advantageously, access to the media streams and/or use of the content is typically achieved such that user is free of all management of content and resources. Accordingly, the processes used to access, make, and use the content is transparent to the user so that the user is provided with a seamless media experience simply as a result of selecting a desired Work. In particular, the user does not need to wait for mass downloads to complete, the user does not transfer files, the user does not delete files, the user does not interact with files or folders in any way, and the user does not manage memory or storage resources. For example, with respect to the latter, a memory manager, such as the memory manager 152 described with reference to FIG. 3 is provided.

The function of the memory manager is to ensure that there is sufficient memory available to receive the media files (i.e., including the eText or eText segment files, the large numbers of small digital audio files, and/or ancillary files) to ensure that sufficient media content is available when needed, and to ensure that a quantity of already rendered media content is maintained (e.g., so a user can rewind the media stream). In one embodiment, the purge of media files is determined using time and time offsets. For example, as discussed above, a user's position within a text or audio stream can be determined and expressed as a time offset. This time offset information is used to free up memory or resources should the need arise. For example, the first 60 chapters of Moby Dick, both eText, audio, and ancillary content can be purged from a devices memory or storage when the user has advanced sufficiently beyond that content making it unlikely that they will use it again, or when the space used by such content is required for the content of a different book or for the content of an ancillary process (e.g., Application Update).

The memory manager, together with a download manager and a media coordinator, are part of an integrated, network-based software product used to render the media streams using a media player (e.g., which for example, renders eText and audio). The software product includes a computer-readable code that allows the user to use a plurality of standard player control buttons to begin rendering the media stream(s), stop or pause rendering of the media stream(s), and/or fast forward/rewind within the media stream(s). Notably, the rewind and fast-forward control buttons do not actually act on the audio or eText streams, but rather use time offsets to reposition the user within the media streams. In one embodiment the fast-forward/rewind times are provided by a set time (e.g., corresponding to 30 seconds). In other embodiments, the fast-forward/rewind times are calculated based on the start times of sequential Virtual Pages (e.g., to reposition the audio stream from a point corresponding to the start of one Virtual Page to the next Virtual Page. Accordingly, the user is able to fast forward and rewind through the audio stream and/or eText stream, even if one or both of the media streams are not resident.

Advantageously, the software uses the Virtual Media Descriptor in the transmission and rendering processes to link the different media streams (e.g., the audio stream and the eText stream) to the common timeline provided by the selected Derivative Work. Accordingly, the user can listen to only the audio stream, can read only the eText, can switch between the audio stream and the eText stream, or can have both the audio stream and the eText rendered simultaneously. In fact, a particularly advantageous aspect of using the common timeline is that the process of rendering the audio stream is synchronized with the display of the eText using a separate file (e.g., the Virtual Media Descriptor), and thus does not require that synchronizing information be encoded within the data files (e.g., the eText streams and/or the audio stream). Accordingly, a simpler system is provided. Moreover, the common timeline provides automated page turns for the rendered eText (i.e., based on time offsets of the simultaneously rendered audio stream). In contrast, prior art eBook readers that provide audio and text rendering require the user to manually turn each virtual text page because the eText and audio stream are not fully synchronized.

In addition, since the software uses the time or time offsets within the Virtual Media Descriptor in the transmission and rendering processes, the navigation of the media stream(s) is substantially independent of format type. Accordingly, a user reading an eBook on a first eReader can create a bookmark for a selected position, and e-mail the bookmark to another person who then begins reading the eBook from the bookmarked position on a second other eReader. Since it is the time offsets that determine which part of the selected eText and/or audio stream will be rendered first, it is possible for the first and second eReaders to use different formats (e.g., PDF and epub). This is particularly advantageous since eBook formats and file types continue to develop and change with time and since many platforms are available.

Notably, in addition to the correlation of audio segments with text segments using time offsets, in some embodiments of the instant invention images, video, and/or advertising, are also correlated with text using time. For example, in general, the Virtual Media Descriptor will include Virtual Media Streams that represent various forms of ancillary content including, but not limited to, illustrations, figures, images, photographs and advertising. Each of these Virtual Media Streams will have time offset information contained within it that is used to manage and render the relevant content. This time offset information is typically derived relative to the information contained within the Virtual Audio Stream of the Virtual Media Descriptor. As a result, the timing information is optionally used to insert or display relevant content based on the timing information associated with the then currently rendered page. As discussed above with respect to text content, each character position will have a start time, an end time and a duration. Therefore a sequential collection of character positions will have a start time, an end time, and a duration. A sequential collection of character positions is a literary passage and may represent, but is not limited to, a word, a phrase, a sentence, a paragraph, a chapter, a title, a footnote, or any multiples or parts thereof. Therefore, each literary passage has a start time, an end time and a duration. Each instance of ancillary content, an illustration for example, will also have a start time, an end time, and a duration. As various pages of text are rendered, any instance of ancillary content is optionally inserted in the rendered page relative to the time offset information by comparing the time offset information associated with various literary passages and ancillary content. The initial insertion of ancillary content in the rendered text is based on a comparison of the start times of the ancillary content and the start time of a literary passage. Where the start times are not identical, a time calculation is made to extrapolate the appropriate point of insertion on the rendered page. In one embodiment, the insertion will be between lines of rendered text. In other embodiments, the ancillary content is inserted such that rendered text surrounds the ancillary content. In yet another embodiment, the ancillary content is inserted such that rendered text and the ancillary content are positioned in another relationship (e.g., side by side).

In some embodiments, a literary passage for which there is an associated element of ancillary content is rendered on more than one page. In particular, when the start time of the literary passage falls between the start time and end time of a rendered page, and the end time of the literary passage falls between the start time and end time of some subsequent page, then as each page is rendered, the element of ancillary content is rendered with the rendered literary passage on each subsequent page. For example, consider a children's picture book where, when printed on paper, a page may have an illustration in the top half of each page with the text of the story beneath it. Clearly the illustration is directly associated with the literary passage that accompanies it. The same page can be rendered electronically in the same format. However, the electronic version allows the user to change font sizes and styles. A substantial increase in font size may force the size of the page to exceed the visual rendering dimensions, forcing what was originally one page into two or more pages. Utilizing the start time and end time and duration of the literary passage and the illustration allows the illustration to be rendered on each rendered page containing any part of the literary passage.

Advantageously, the correlation of these additional media components (e.g., ancillary content) with text segments is optionally accomplished in the absence of the audio segments that were used to generate the time offsets. Further advantageously, since the correlation between the audio segments and text segments is provided with time offsets, the correlation is often provided with higher precision than methods of encoding the data files with correlations points. More specifically, since the timeline is a continuous feature the correlation between text segments and audio segments is easily calculated and/or extrapolated for any point within the timeline, and is not limited to specific correlation points or segment boundaries.

Of course, the above embodiments have been provided as examples only. It will be appreciated by those of ordinary skill in the art that various modifications, alternate configurations, and/or equivalents will be employed without departing from the spirit and scope of the invention. For example, while the above-described embodiments discuss a Virtual Media Descriptor for navigating through digital media such as audio streams, eText, illustrations, graphics, video, figures, tables, user generated content, and/or advertising, it is noted that the selected media will be determined, at least in part, by the content of the Originating Work. For example, if the Originating Work does not include any illustrations, the Virtual Media Descriptor will not include a Virtual Illustration Stream. In addition, in the above-described embodiments, the bookmarks have been described as including a time or time offset. However, in some embodiments of the instant invention the bookmark will include two times or time offsets. For example, in one embodiment of the instant invention a user reading a selected eText segment creates a bookmark by selecting/highlight a range of text. In this embodiment, the bookmark includes a first time offset representing the time offset of the start of the selected text, and a second time offset representing the time offset of the end of the selected text. Advantageously, these bookmarks including two time offsets are used to render only the bookmarked section (e.g., text or audio). In each case, the bookmark includes a time or time offset that is external to the descriptor file, and thus is easily electronically transmitted between users (e.g., by email, ftp, or html). Accordingly, the scope of the invention is therefore intended to be limited solely by the scope of the appended claims.

The invention claimed is:

1. A method comprising:
   accessing, by a client device, a network accessible library having stored thereon an image stream of static graphic images and a corresponding audio stream;
   downloading to the client device from the network accessible library one or more static graphic images from the image stream, wherein the one or more static graphic images are each associated with time information including at least one of a start time, an end time, and a duration relative to a timeline of the audio stream;
   assembling, by the client device, a first page from the one or more static graphic images;
   assigning to the first page, by the client device, time information including at least one of a start time, an end time, and a duration relative to the timeline of the audio stream, wherein the time information for the first page is determined on the basis of the time information for the one or more static graphic images;
   downloading to the client device from the network accessible library a portion of the audio stream including a first time offset, wherein the first time offset corresponds to a first position on the first page; and
   simultaneously rendering the first page and the portion of the audio stream on the client device by using the time information for the one or more static graphic images or for the first page, wherein the portion of the audio stream is rendered in dependence upon the first time offset.

2. The method of claim 1, wherein the network accessible library includes one or more server devices.

3. The method of claim 1, wherein the number of the one or more static graphic images included on the first page is determined on the basis of the size of the one or more static graphic images and the graphic rendering capability of the client device.

4. The method of claim 1, wherein the first time offset is a start time of the first page, a start time of one of the one or more static graphic images, or a bookmarked position.

5. The method of claim 1, further comprising:
   assembling a second page from the one or more static graphic images; and
   assigning to the second page time information including at least one of a start time, an end time, and a duration relative to the timeline of the audio stream, wherein the time information for the second page is determined on the basis of the time information for the one or more static graphic images.

6. The method of claim 5, further comprising:
   automatically turning from the first page to the second page in dependence upon the time information for the first page or for the second page as the portion of the audio stream is rendered.

7. The method of claim 6, wherein the portion of the audio stream is rendered without any perceptible interruption.

8. The method of claim 1, further comprising:
   setting a second time offset as a bookmarked position, wherein the second time offset corresponds to a second position on the first page or a position in the timeline of the audio stream.

9. The method of claim 8, further comprising:
   transmitting the bookmarked position to a network accessible server device or a second other client device.

10. The method of claim 1, wherein the time information for the one or more static graphic images is external to the audio stream.

11. The method of claim 10, wherein the time information for the one or more static graphic images is stored in a descriptor file.

12. The method of claim 1, wherein the one or more static graphic images contain elements that form text characters when rendered.

13. The method of claim 12, further comprising:
   rendering on the first page one or more text passages representing the text characters formed by the elements in the one or more static graphic images; and
   assigning to each of the one or more text passages time information including at least one of a start time, an end time, and a duration relative to the timeline of the audio stream, wherein the time information for each text passage is determined on the basis of the time information for the one or more static graphic images.

14. The method of claim 13, wherein only a portion of a first text passage associated with a first static graphic image is rendered on the first page.

15. The method of claim 14, wherein a remaining portion of the first text passage is rendered on a second page, wherein the first static graphic image is replicated on the second page in association with the remaining portion of the first text passage, and wherein the second page is repaginated.

16. A non-transitory computer-readable storage medium having stored thereon instructions which, when executed by a processor of a computing device, cause the computing device to:
   access a network accessible library having stored thereon an image stream of static graphic images and a corresponding audio stream;
   download from the network accessible library one or more static graphic images from the image stream, wherein the one or more static graphic images are each associated with time information including at least one of a start time, an end time, and a duration relative to a timeline of the audio stream;
   assemble a first page from the one or more static graphic images;
   assign to the first page time information including at least one of a start time, an end time, and a duration relative to the timeline of the audio stream, wherein the time information for the first page is determined on the basis of the time information for the one or more static graphic images;
   download from the network accessible library a portion of the audio stream including a first time offset, wherein the first time offset corresponds to a first position on the first page; and
   simultaneously render the first page and the portion of the audio stream by using the time information for the one or more static graphic images or for the first page, wherein the portion of the audio stream is rendered in dependence upon the first time offset.

* * * * *

UNITED STATES PATENT AND TRADEMARK OFFICE
CERTIFICATE OF CORRECTION

PATENT NO. : 10,805,111 B2
APPLICATION NO. : 16/267550
DATED : October 13, 2020
INVENTOR(S) : McCue et al.

It is certified that error appears in the above-identified patent and that said Letters Patent is hereby corrected as shown below:

On the Title Page

Item (63) "Continuation of application No. 15/652,236, filed on" should read -- "Continuation of application No. 15/652,326, filed on --

In the Specification

Column 1, Line 9, "tion Ser. No. 15/652,236, filed on" should read -- "ion Ser. No. 15/652,326, filed on --

Signed and Sealed this
Twenty-eighth Day of March, 2023

Katherine Kelly Vidal
*Director of the United States Patent and Trademark Office*